United States Patent
Lee et al.

(10) Patent No.: US 11,546,922 B2
(45) Date of Patent: Jan. 3, 2023

(54) METHOD AND DEVICE FOR PERFORMING POWER CONTROL IN NR V2X

(71) Applicant: LG ELECTRONICS INC., Seoul (KR)

(72) Inventors: Seungmin Lee, Seoul (KR); Kyuhwan Kwak, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 17/257,690

(22) PCT Filed: Aug. 5, 2019

(86) PCT No.: PCT/KR2019/009722
§ 371 (c)(1),
(2) Date: Jan. 4, 2021

(87) PCT Pub. No.: WO2020/027636
PCT Pub. Date: Feb. 6, 2020

(65) Prior Publication Data
US 2021/0120564 A1    Apr. 22, 2021

Related U.S. Application Data

(60) Provisional application No. 62/714,106, filed on Aug. 3, 2018.

(51) Int. Cl.
*H04W 72/10* (2009.01)
*H04W 4/40* (2018.01)
(Continued)

(52) U.S. Cl.
CPC ......... *H04W 72/10* (2013.01); *H04W 4/40* (2018.02); *H04W 28/0289* (2013.01);
(Continued)

(58) Field of Classification Search
CPC ... H04W 72/10; H04W 4/40; H04W 28/0289; H04W 72/0446; H04W 72/0453;
(Continued)

(56) References Cited

U.S. PATENT DOCUMENTS

2013/0178221 A1*  7/2013  Jung ............... H04W 52/146
                                                                    455/450
2017/0367087 A1   12/2017  Seo
(Continued)

FOREIGN PATENT DOCUMENTS

WO  2018016907   1/2018
WO  2018121621   7/2018

OTHER PUBLICATIONS

Intel R1-1717330 sidelink carrier aggregation for mode-4 LTE V2X communication Oct. 2017 (Year: 2017).*
(Continued)

*Primary Examiner* — Rina C Pancholi
(74) *Attorney, Agent, or Firm* — Lee Hong Degerman Kang & Waimey

(57) ABSTRACT

A method by which a first device (100) performs sidelink transmission is provided. The method can comprise the steps of: determining a priority of a first carrier including a plurality of BWPs; allocating transmission power for the first carrier on the basis of the priority; and performing sidelink transmission through the plurality of BWPs on the basis of the transmission power.

12 Claims, 31 Drawing Sheets

(51) Int. Cl.
  *H04W 28/02* (2009.01)
  *H04W 72/04* (2009.01)
  *H04W 92/18* (2009.01)

(52) U.S. Cl.
  CPC ... *H04W 72/0446* (2013.01); *H04W 72/0453* (2013.01); *H04W 72/0473* (2013.01); *H04W 92/18* (2013.01)

(58) Field of Classification Search
  CPC ............. H04W 72/0473; H04W 92/18; H04W 28/0252; H04W 40/08; H04W 52/281; H04W 52/383; H04W 4/44; Y02D 30/70
  See application file for complete search history.

(56) References Cited

U.S. PATENT DOCUMENTS

2018/0183551 A1\* 6/2018 Chou ................ H04W 72/1268
2020/0053524 A1\* 2/2020 Novlan ............. H04W 72/0453
2021/0274457 A1\* 9/2021 Zhao ................ H04W 56/0015

OTHER PUBLICATIONS

Huawei R1-1801347 summary of remaining issues on bandwidth part and wideband operation Mar. 2018 (Year: 2018).\*
PCT International Application No. PCT/KR2019/009722, International Search Report dated Nov. 8, 2019, 4 pages.
Intel Corporation, "Sidelink Carrier Aggregation for Mode-4 LTE V2V Communication", R1-1717330, 3GPP TSG RAN WG1 Meeting #90bis, Oct. 2017, 10 pages.
Huawei, Hisilicon, "Summary of remaining issues on bandwidth part and wideband operation", R1-1801347, 3GPP TSG RAN WG1 Meeting #92, Mar. 2018, 15 pages.

\* cited by examiner

FIG. 9
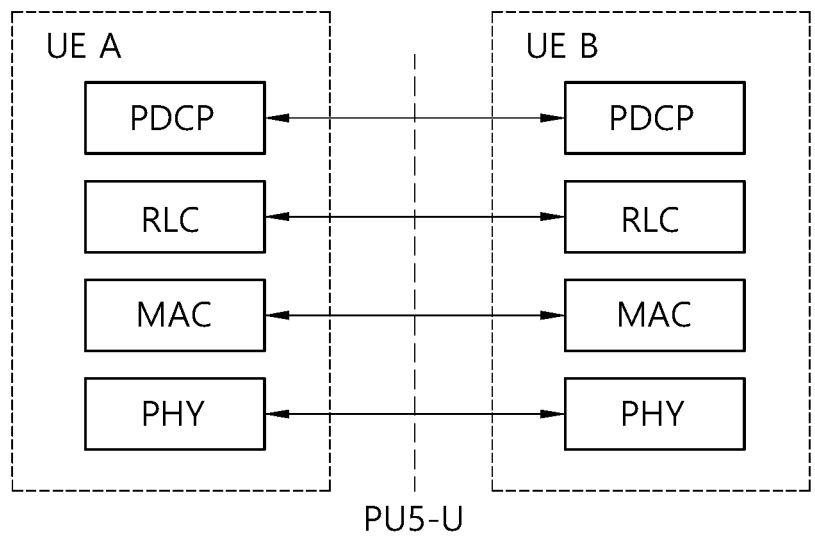
(a)
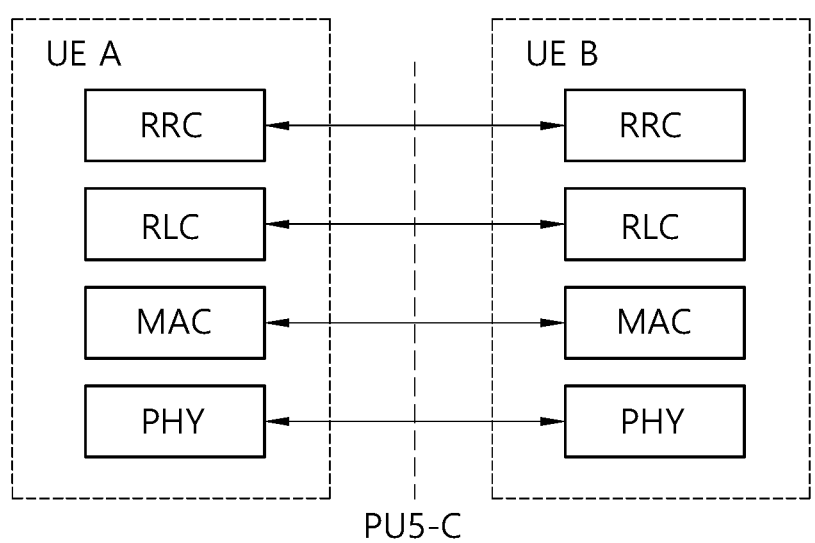
(b)

FIG. 10
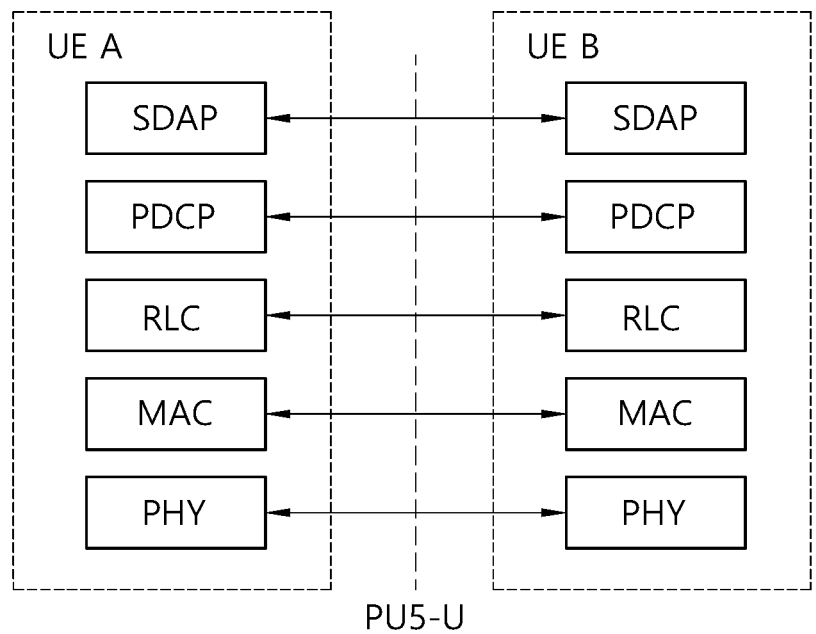
(a)
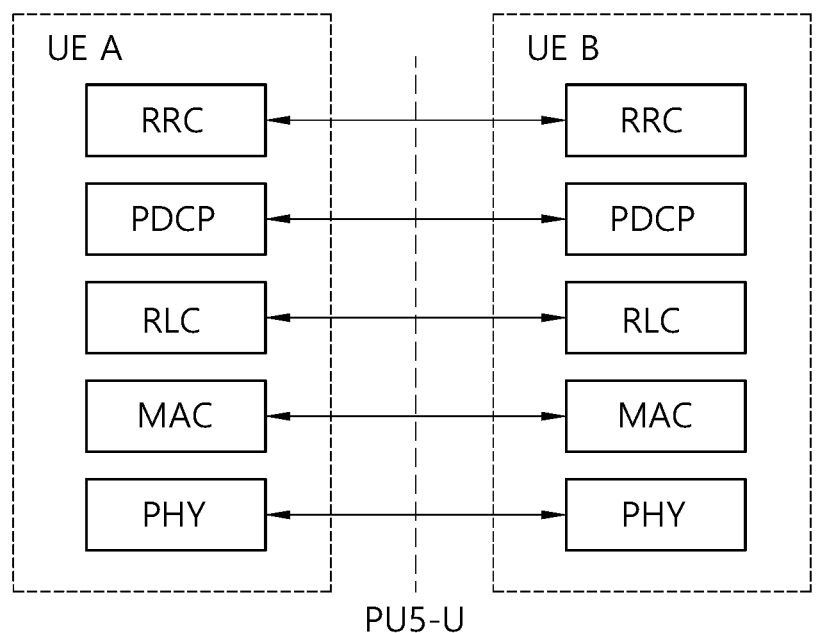
(b)

METHOD AND DEVICE FOR PERFORMING POWER CONTROL IN NR V2X

CROSS-REFERENCE TO RELATED APPLICATIONS

This application is the National Stage filing under 35 U.S.C. 371 of International Application No. PCT/KR2019/009722, filed on Aug. 5, 2019, which claims the benefit of U.S. Provisional Application No. 62/714,106 filed on Aug. 3, 2018, the contents of which are all hereby incorporated by reference herein in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

FIG. 1 shows examples of 5G usage scenarios to which the technical features of the present disclosure can be applied. The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

In NR sidelink communication or NR V2X communication, a carrier may include a plurality of BWPs. Therefore, a UE needs to perform power control in view of the plurality of BWPs.

According to an exemplary embodiment, there is provided a method for a first device 100 to perform sidelink transmission. The method may include: determining the priority of a first carrier including a plurality of BWPs; allocating transmission power for the first carrier based on the priority; and performing sidelink transmissions through the plurality of BWPs based on the transmission power.

According to another exemplary embodiment, there is provided a first device 100 for performing sidelink transmission. The first device may include: at least one memory; at least one transceiver; and at least one processor to couple the at least one memory and the at least one transceiver, wherein the processor may be configured to: determine the priority of a first carrier including a plurality of BWPs; allocate transmission power for the first carrier based on the priority; and control the at least one transceiver to perform sidelink transmissions through the plurality of BWPs based on the transmission power.

In sidelink communication, a UE may efficiently perform sidelink transmission on a plurality of BWPs.

BRIEF DESCRIPTION OF THE DRAWINGS

FIG. 9 shows a protocol stack for a sidelink communication to which the exemplary embodiment of the present disclosure can be applied.

FIG. 10 shows a protocol stack for a sidelink communication to which the exemplary embodiment of the present disclosure can be applied.

DESCRIPTION OF EXEMPLARY EMBODIMENTS

In this document, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
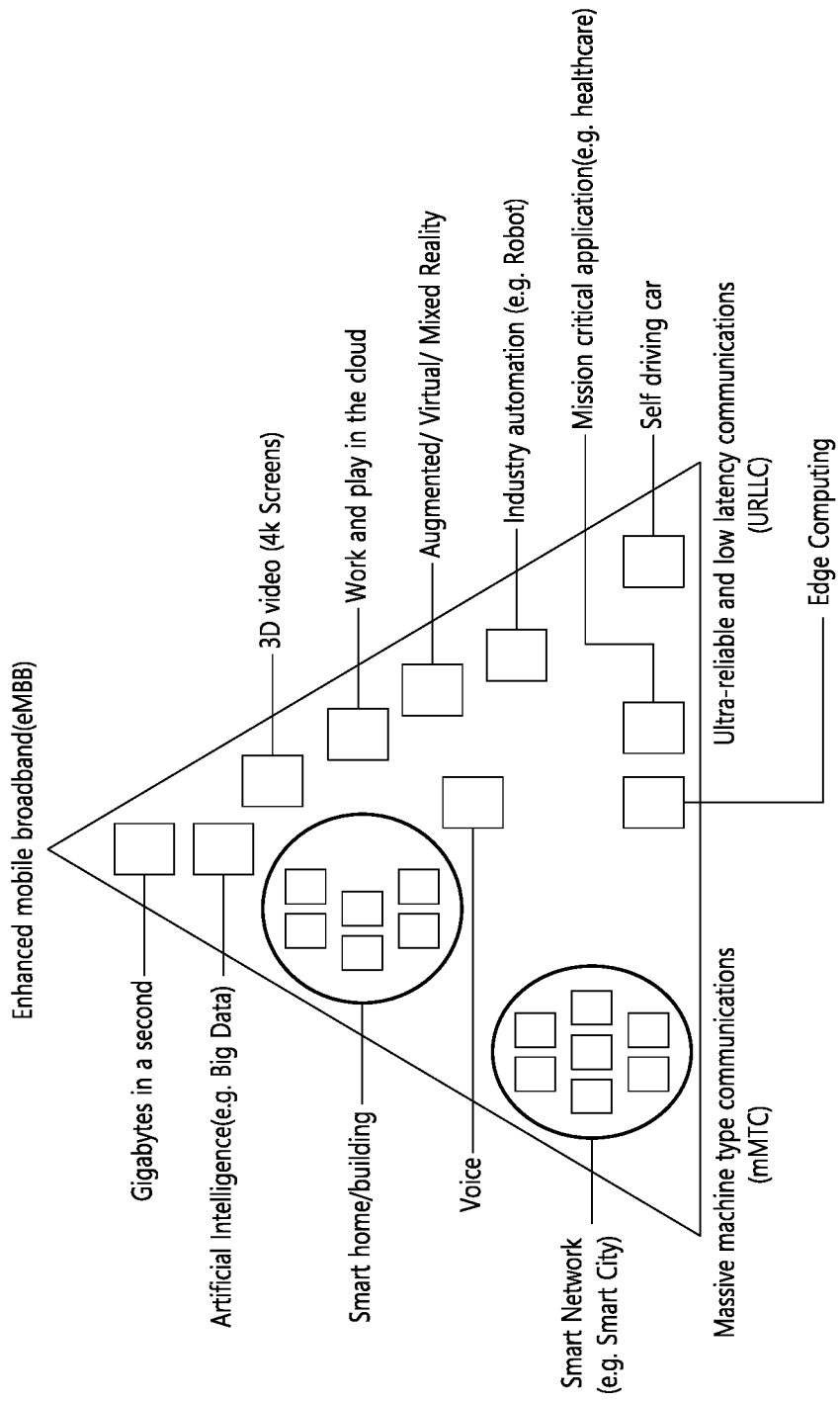
FIG. 1 shows examples of 5G usage scenarios to which the technical features of the present disclosure can be applied.
Figure 2:
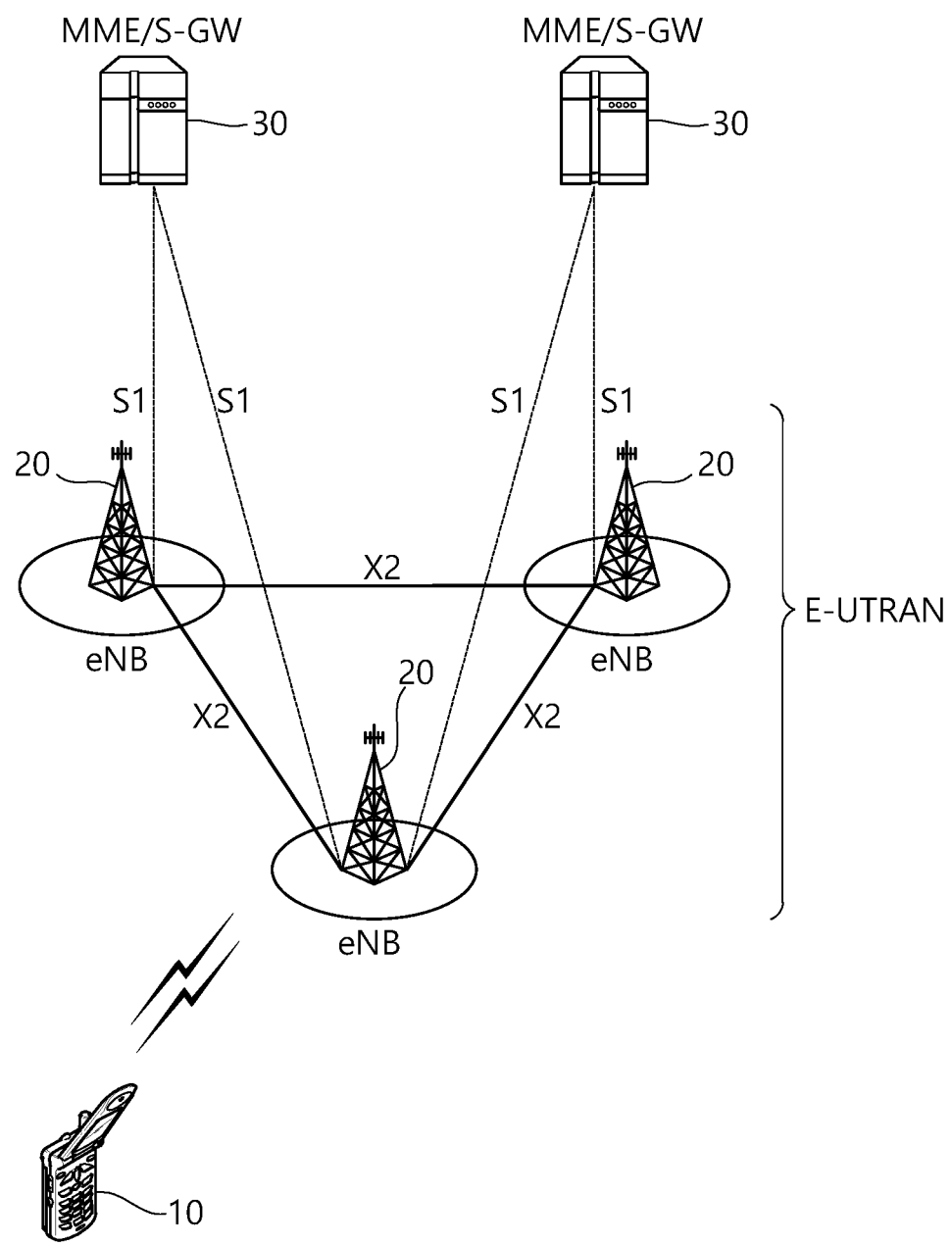
FIG. 2 shows a structure of an LTE system to which an exemplary embodiment of the present disclosure can be applied.

FIG. 2 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 2, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 3:
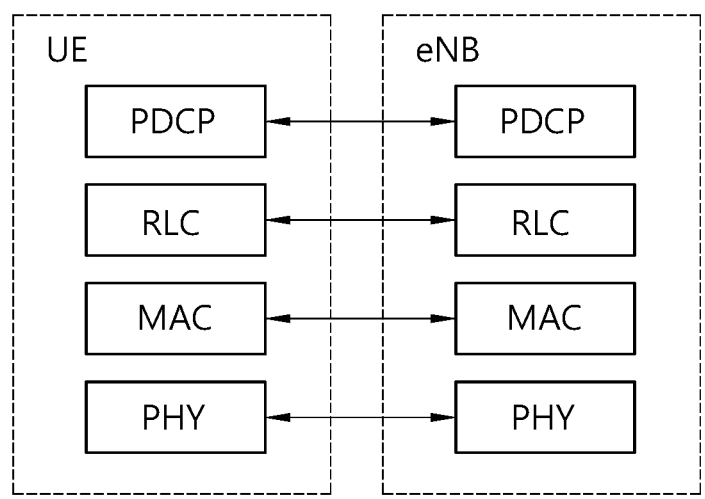
FIG. 3 shows a radio protocol architecture of a user plane to which an exemplary embodiment of the present disclosure can be applied.
Figure 4:
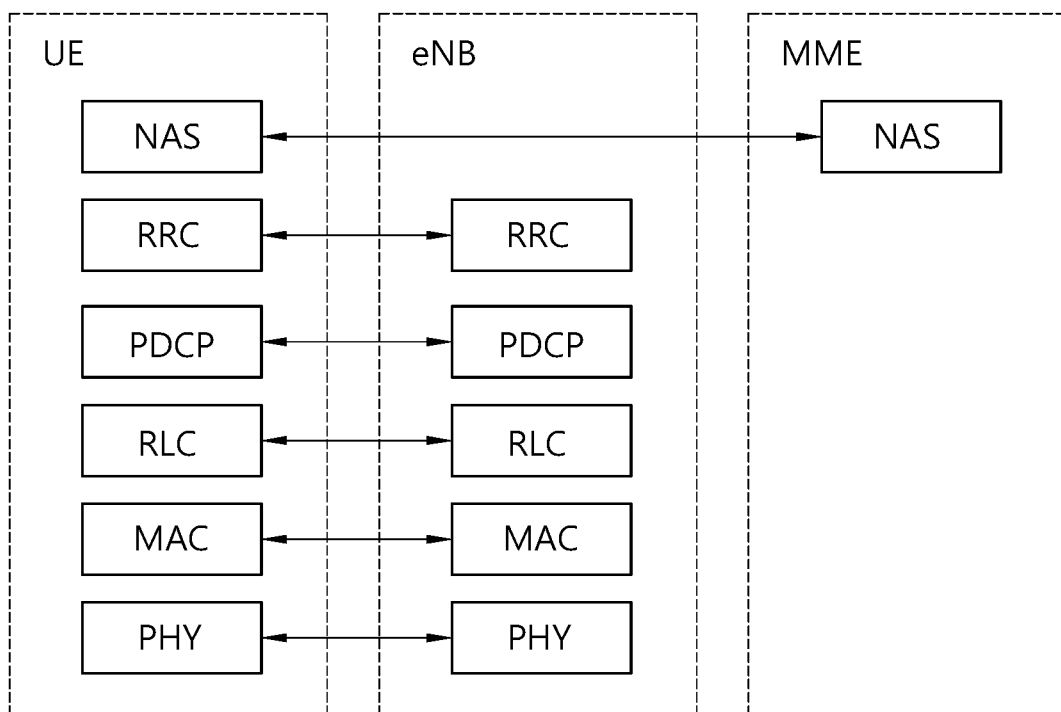
FIG. 4 shows a radio protocol architecture of a control plane to which an exemplary embodiment of the present disclosure can be applied.

FIG. 3 shows a radio protocol architecture of a user plane to which an exemplary embodiment of the present disclosure can be applied. FIG. 4 shows a radio protocol architecture of a control plane to which an exemplary embodiment of the present disclosure can be applied. The user plane is a protocol stack for user data transmission, and the control plane is a protocol stack for control signal transmission.

Referring to FIG. 3 and FIG. 4, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in a RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 5:
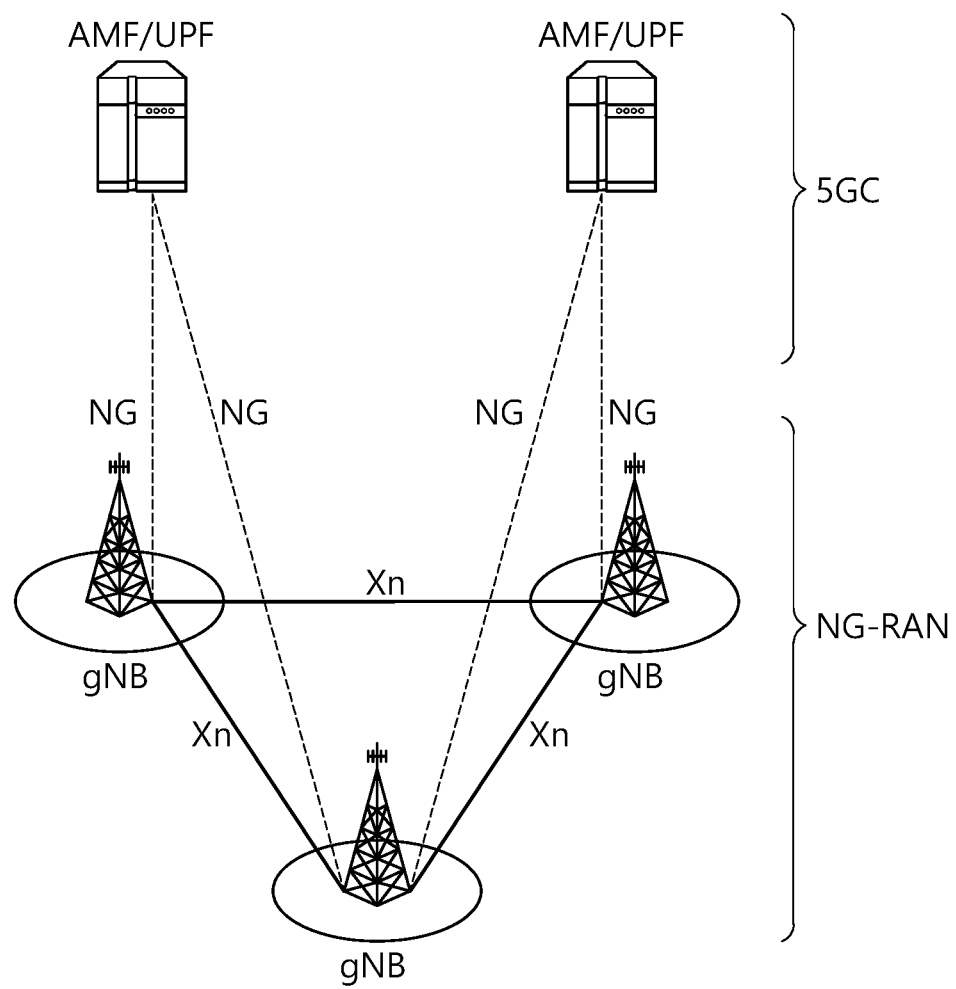
FIG. 5 shows a structure of an NR system to which an exemplary embodiment of the present disclosure can be applied.

FIG. 5 shows a structure of an NR system to which an exemplary embodiment of the present disclosure can be applied.

Referring to FIG. 5, an NG-RAN may include a gNB and/or eNB providing a user plane and control plane protocol termination to a user. FIG. 5 shows a case where the NG-RAN includes only the gNB. The gNB and the eNB are connected to one another via Xn interface. The gNB and the eNB are connected to one another via 5th Generation (5G)

Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 6:
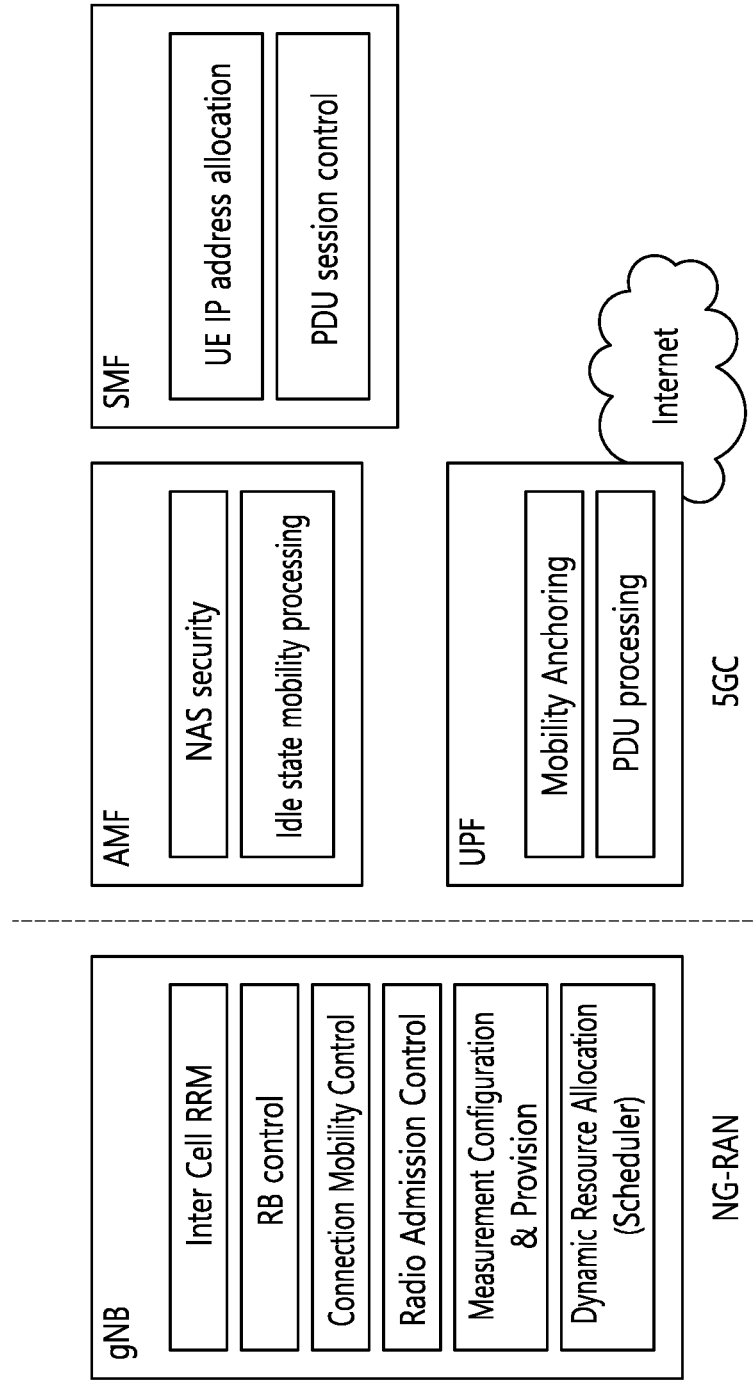
FIG. 6 shows a functional division between an NG-RAN and a 5GC to which an exemplary embodiment of the present disclosure can be applied.

FIG. 6 shows a functional division between an NG-RAN and a 5GC to which an exemplary embodiment of the present disclosure can be applied.

Referring to FIG. 6, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 7:
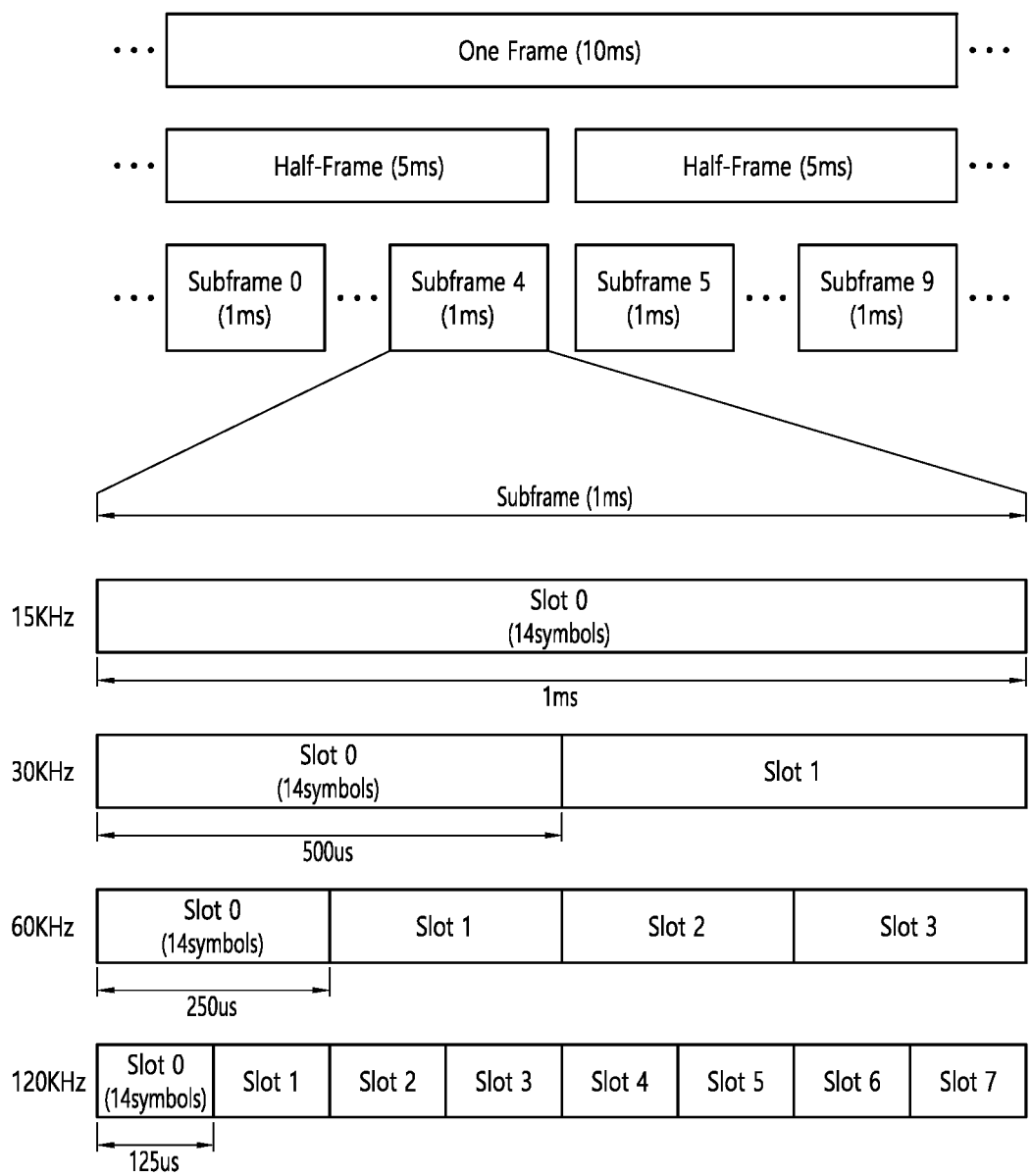
FIG. 7 shows a structure of a radio frame of an NR to which an exemplary embodiment of the present disclosure can be applied.

FIG. 7 shows a structure of a radio frame of an NR to which an exemplary embodiment of the present disclosure can be applied.

Referring to FIG. 7, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
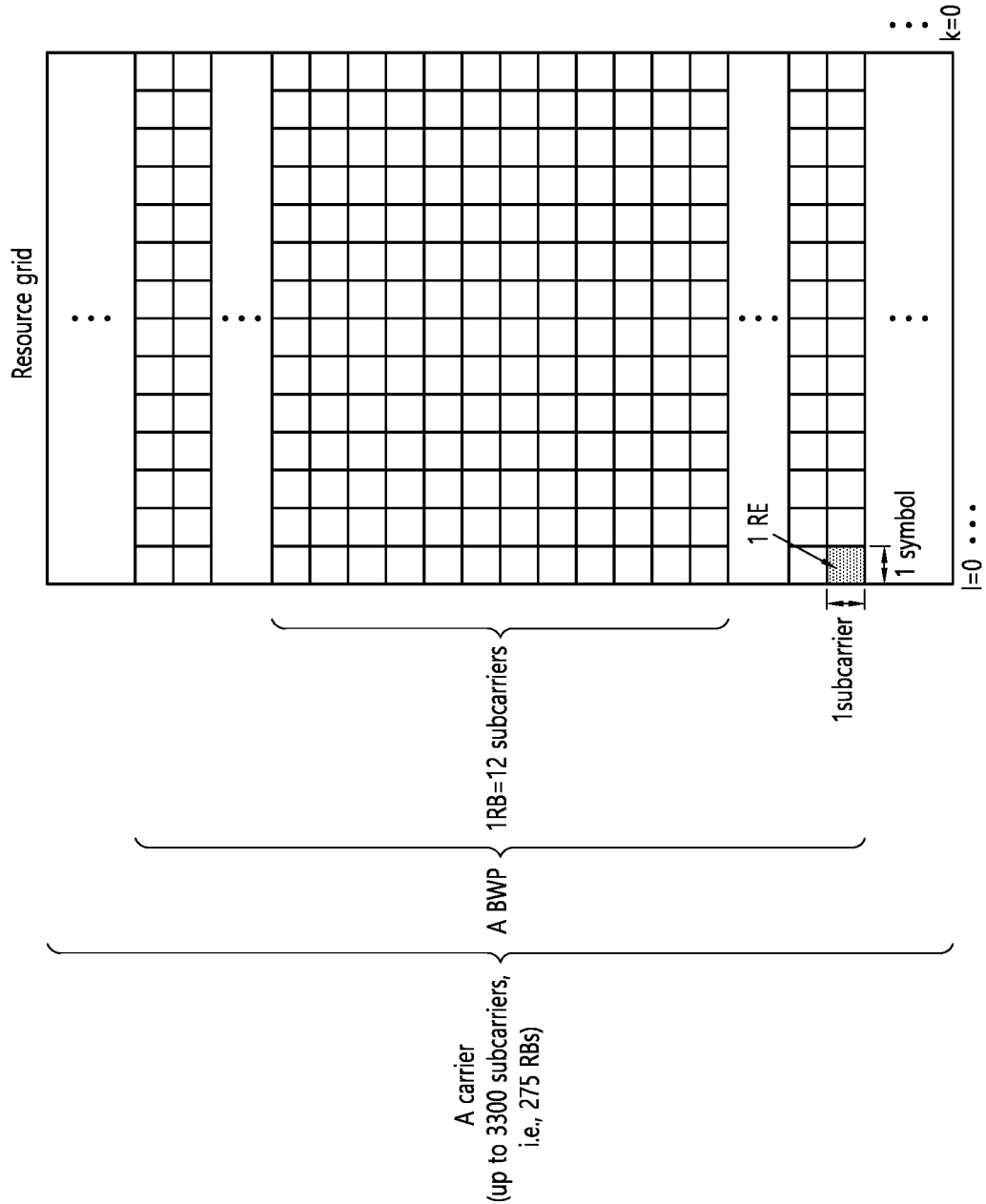
FIG. 8 shows a structure of a slot of an NR frame to which an exemplary embodiment of the present disclosure can be applied.

FIG. 8 shows a structure of a slot of an NR frame to which an exemplary embodiment of the present disclosure can be applied.

Referring to FIG. 8, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

FIG. 9 shows a protocol stack for a sidelink communication to which the exemplary embodiment of the present disclosure can be applied. More specifically, (a) of FIG. 9 represents a user plane protocol stack of LTE, and (b) of FIG. 9 represents a control plane protocol stack of LTE.

FIG. 10 shows a protocol stack for a sidelink communication to which the exemplary embodiment of the present disclosure can be applied. More specifically, (a) of FIG. 10 represents a user plane protocol stack of NR, and (b) of FIG. 10 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
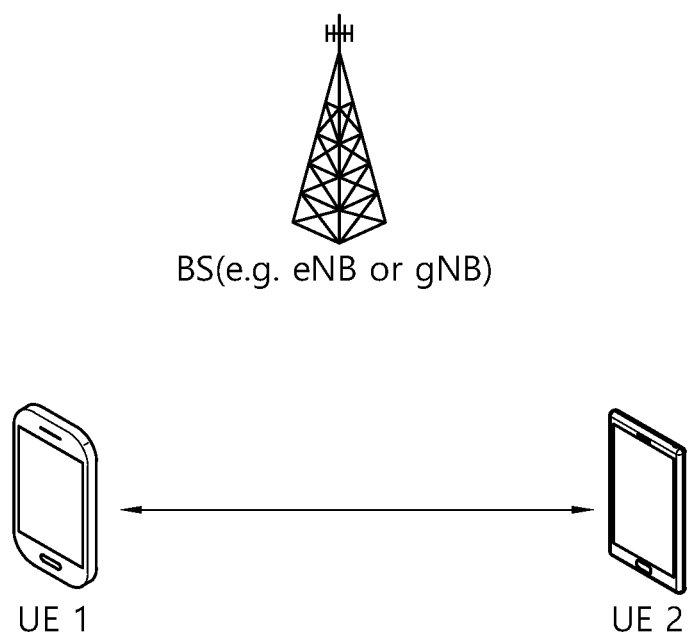
FIG. 11 shows a UE performing V2X or sidelink communication to which an exemplary embodiment of the present disclosure can be applied.

FIG. 11 shows a UE performing V2X or sidelink communication to which an exemplary embodiment of the present disclosure can be applied.

Referring to FIG. 11, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 12:
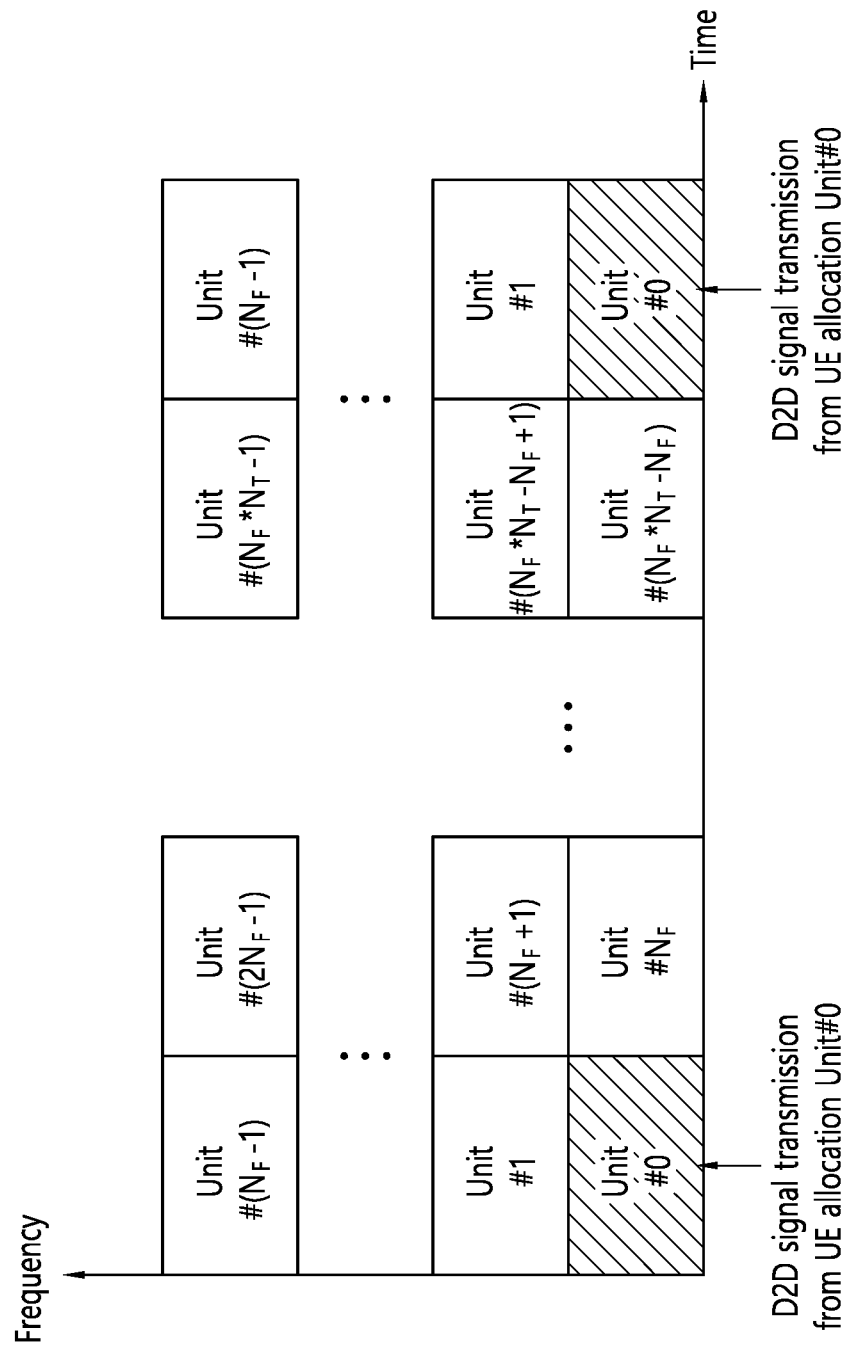
FIG. 12 shows an exemplary configuration of a resource unit to which an exemplary embodiment of the present disclosure can be applied.

FIG. 12 shows an exemplary configuration of a resource unit to which an exemplary embodiment of the present disclosure can be applied.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of NT number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 13:
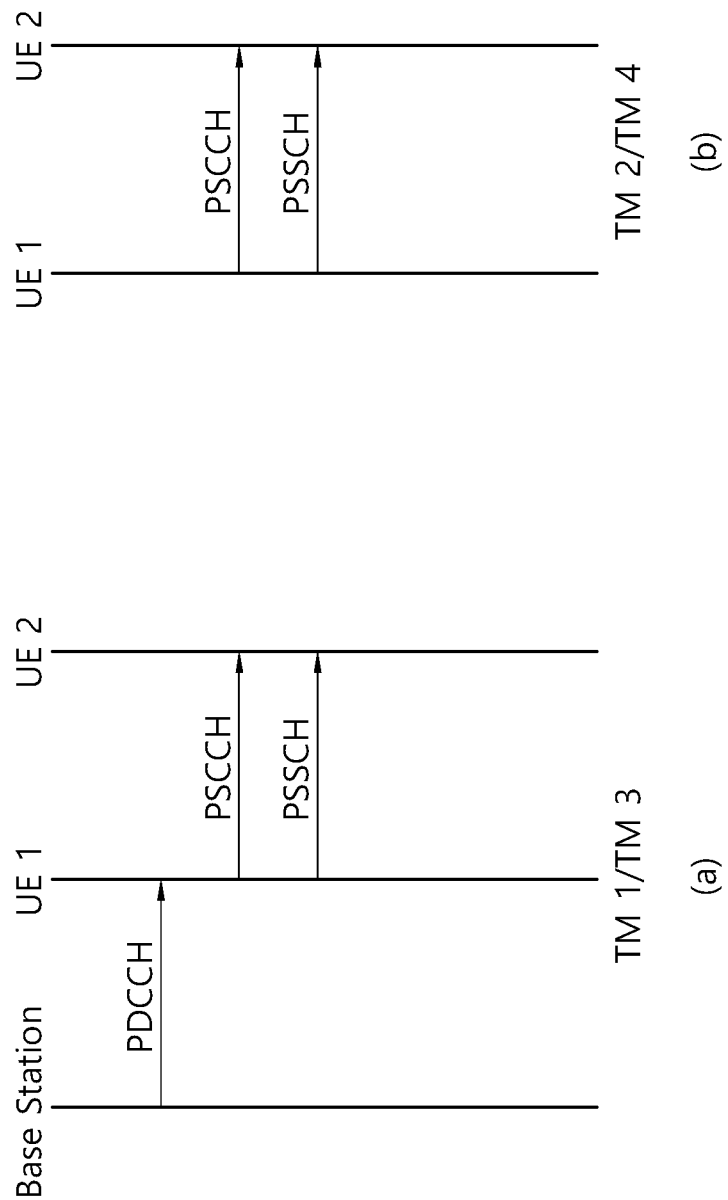
FIG. 13 shows user equipment (UE) operations according to a transmission mode (TM) being related to sidelink/V2X communication to which an exemplary embodiment of the present disclosure can be applied.

FIG. 13 shows user equipment (UE) operations according to a transmission mode (TM) being related to sidelink/V2X communication to which an exemplary embodiment of the present disclosure can be applied.

(a) of FIG. 13 represents UE operations being related to transmission mode 1 or transmission mode 3, and (b) of FIG. 13 represents UE operations being related to transmission mode 2 or transmission mode 4.

Referring to (a) of FIG. 13, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 14:
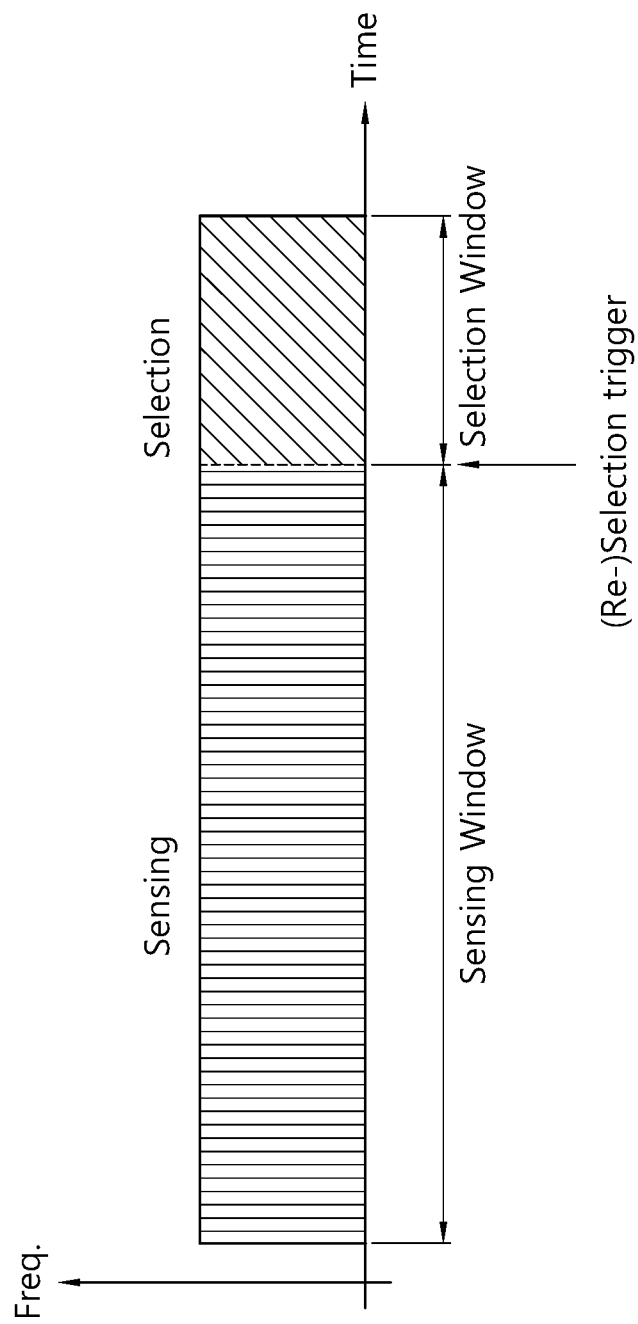
FIG. 14 shows an example where a transmission resource to which an exemplary embodiment of the present disclosure can be applied.

FIG. 14 shows an example where a transmission resource to which an exemplary embodiment of the present disclosure can be applied.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above described methods.

Hereinafter, synchronization acquisition of an SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 15:
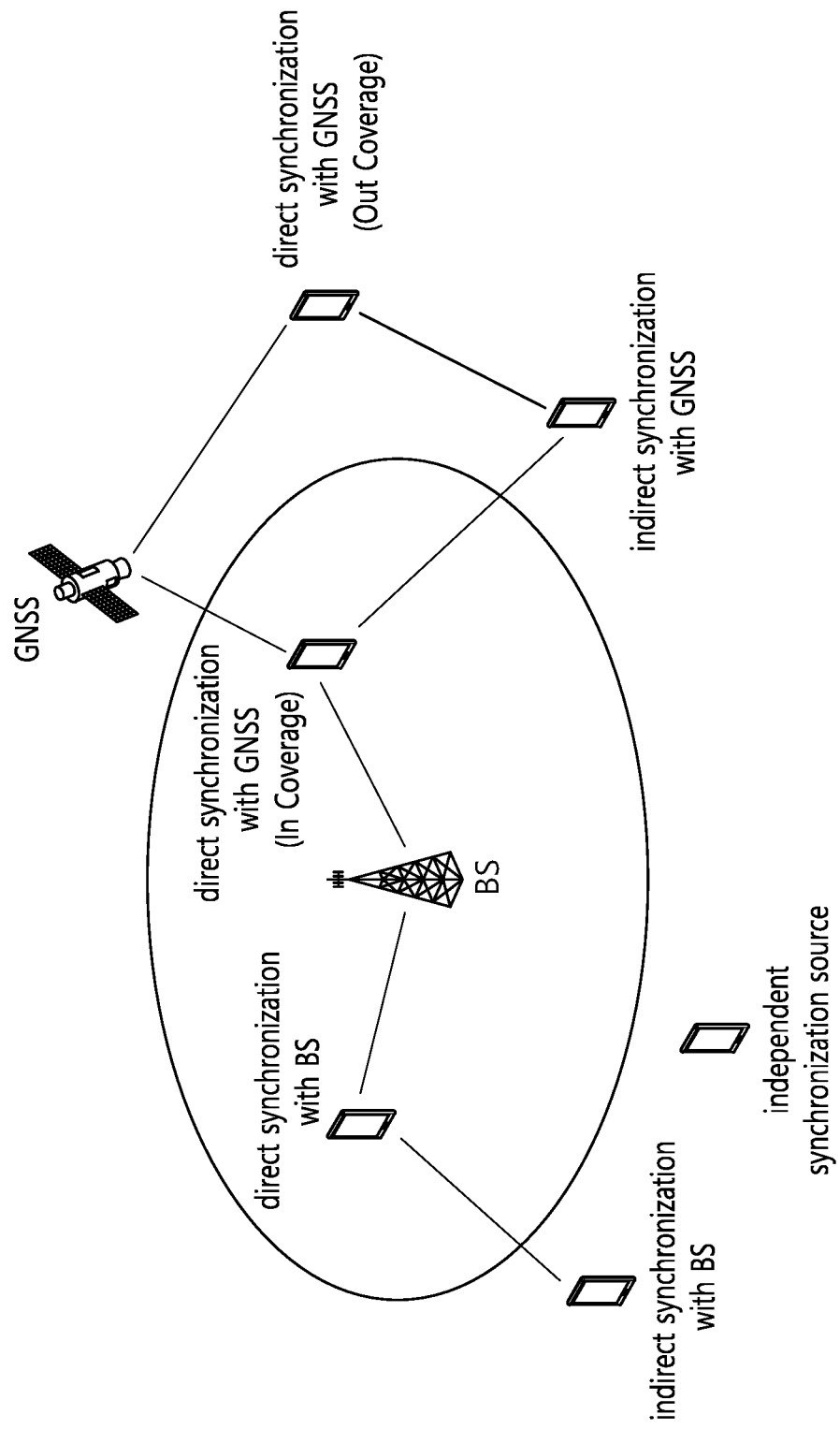
FIG. 15 shows a synchronization source or synchronization reference of V2X to which an exemplary embodiment of the present disclosure can be applied.

FIG. 15 shows a synchronization source or synchronization reference of V2X to which an exemplary embodiment of the present disclosure can be applied.

Referring to FIG. 15, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 3. Table 3 is for exemplary purposes only, and the relation between the synchronization source and the synchronization priority may be defined in various forms.

TABLE 3

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or BS-based synchronization may be (pre-)configured. In a single-carrier operation, the UE may derive transmission timing of the UE from an available synchronization reference having the highest priority.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 16:
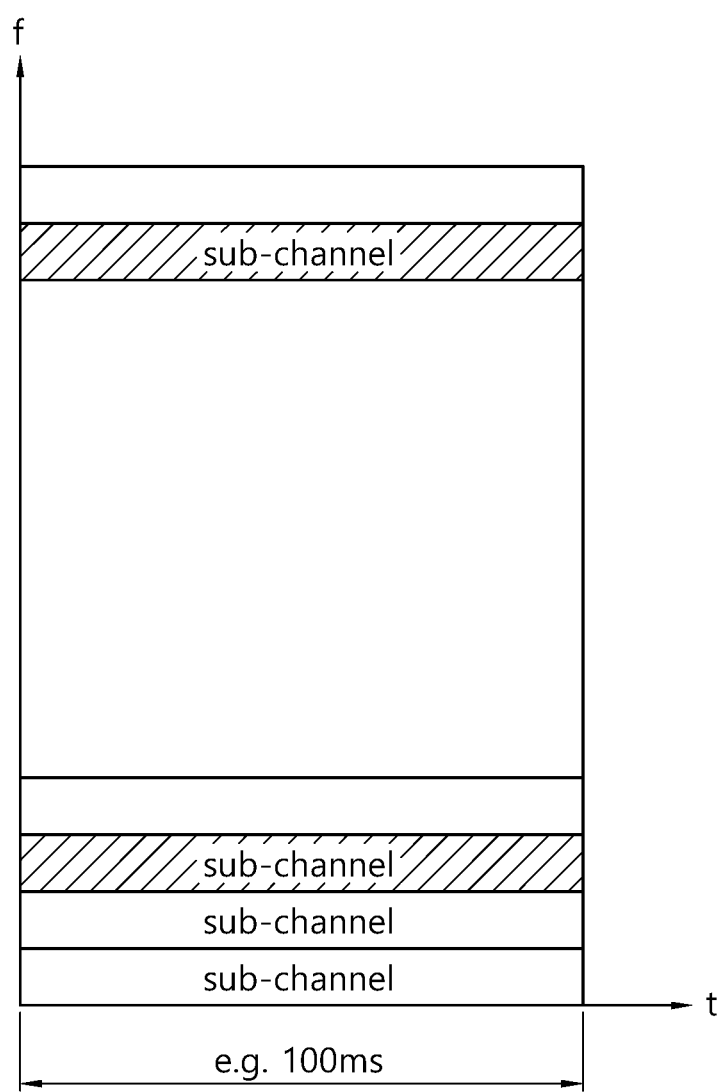
FIG. 16 shows a CBR to which an exemplary embodiment of the present disclosure can be applied.

FIG. 16 shows a CBR to which an exemplary embodiment of the present disclosure can be applied.

Referring to FIG. 16, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 16, if it is assumed that a hatched sub-channel is a sub-channel having a value greater than or equal to a pre-configured threshold, the CBR may denote a ratio of the hatched sub-channels for a period of 100 ms.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, a bandwidth part (BWP) and a carrier will be described.

The BWP may be a consecutive set of physical resource blocks (PRBs) in a given numerology. The PRB may be selected from a consecutive subset of common resource blocks (CRBs) for a given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive a PDCCH, a PDSCH, or a CSI-RS (however, an RRM is excluded) outside the active DL BWP. For example, the UE may not trigger a CSI report for an inactive DL BWP. For example, the UE may not transmit a PUCCH or a PUSCH outside the active UL BWP. For example, in a downlink case, the initial BWP may be given as a consecutive RB set for an RMSI CORESET (configured by a PBCH). For example, in an uplink case, the initial BWP may be given by an SIB for a random access procedure. For example, the default BWP may be configured by a higher layer. For example, an initial value of the default BWP may be an initial DL BWP. For energy saving, if the UE cannot detect DCI for a specific period of time, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 17:
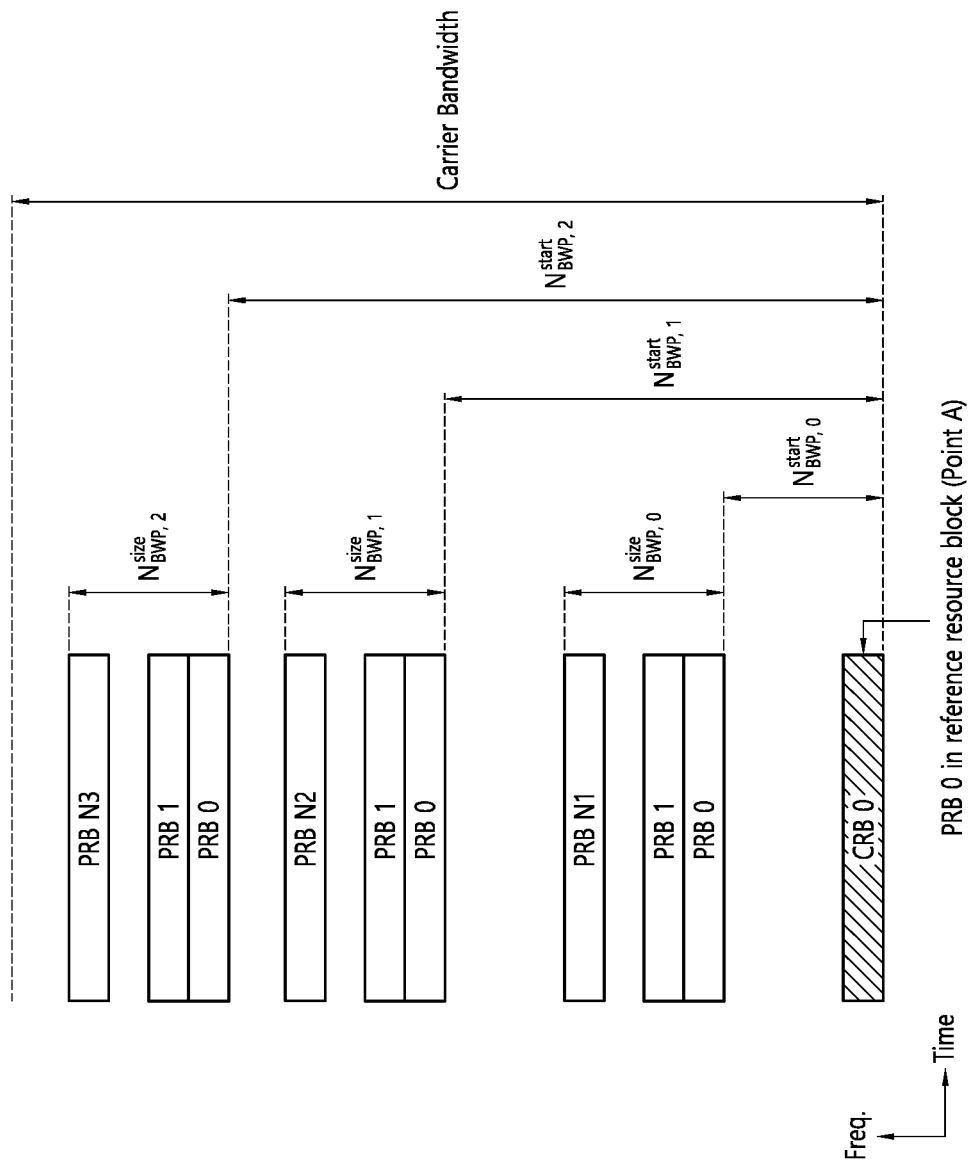
FIG. 17 shows a BWP to which an exemplary embodiment of the present disclosure can be applied.

FIG. 17 shows a BWP to which an exemplary embodiment of the present disclosure can be applied. It is assumed in the embodiment of FIG. 17 that the number of BWPs is 3.

Referring to FIG. 17, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

In LTE V2X communication, when channels and/or signals transmitted on different carriers partially or entirely overlap in the time domain and total power required for transmissions of the channels and/or signals is greater than the maximum power value or maximum transmission power of a UE, transmission power is distributed or transmission is omitted according to the following rules. In this specification, for convenience of description, the maximum power value or maximum transmission power of the UE may be referred to as P_CMAX.

1) Case where transmission of an SL channel/signal and transmission of a WAN UL channel/signal on different carriers partially or entirely overlap in the time domain 1.1) When a ProSe Per-Packet Priority (PPPP) value related to the SL channel/signal is less than a preset threshold (hereinafter, PC_PRITHD), the UE may reduce transmission power for the WAN UL channel/signal until total power required for the transmission of the SL channel/signal and the transmission of the WAN UL channel/signal does not exceed P_CMAX. In this specification, a smaller PPPP value may indicate a higher priority, and a greater PPPP value may indicate a lower priority. That is, when a priority related to the SL channel/signal is higher than a preset priority, the UE may reduce the transmission power for the WAN UL channel/signal until the total power required for the transmission of the SL channel/signal and the transmission of the WAN UL channel/signal does not exceed P_CMAX.

1.2) When the PPPP value related to the SL channel/signal is greater than PC_PRITHD, the UE may reduce transmission power for the SL channel/signal until the total power required for the transmission of the SL channel/signal and the transmission of the WAN UL channel/signal does not exceed P_CMAX.

2) When transmissions of SL channels/signals on different carriers partially or entirely overlap in the time domain, the UE may reduce transmission power for the SL channels/signals in descending order of PPPP values from transmission power for an SL channel/signal related to the greatest PPPP value until total power required for the transmissions of the SL channels/signals does not exceed P_CMAX. For example, even though the UE omits transmission of the SL channel/signal related to the greatest PPPP value, when total power required for transmissions of the remaining SL channels/signals exceeds P_CMAX, the UE may reduce transmission power for an SL channel/signal related to the second greatest PPPP value.

Further, in LTE V2X communication, when transmission of an SL channel/signal and transmission of a WAN UL channel/signal on the same carrier partially or entirely overlap in the time domain, any one transmission is omitted according to the following rules. For example, when a PPPP value related to the SL channel/signal is less than PC_PRITHD, the UE may omit the transmission of the WAN UL channel/signal. For example, when the PPPP value related to the SL channel/signal is greater than PC_PRITHD, the UE may omit the transmission of the SL channel/signal.

As described above, a BWP is introduced in NR sidelink or NR V2X communication. Accordingly, it is necessary to propose a method for a UE to perform power control in a case where there is a carrier including one or more BWPs or in a case where carriers including one or more BWPs are aggregated. Hereinafter, according to an exemplary embodiment of the present disclosure, a method for a UE to perform power control in consideration of a BWP and a device for supporting the same will be described.

In the present specification, sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0,1, . . . , 5 of the second slot of a subframe. In the present specification, PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH).

In the present specification, a receiving operation of the UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or WAN DL signal (e.g., PDCCH, PDSCH, PSS/SSS, etc.). The receiving operation of the UE may include a sensing operation and/or a CBR measuring operation. In the present specification, the sensing operation of the UE may include a PSSCH-RSRP measuring operation based on a PSSCH DM-RS sequence, a PSSCH-RSRP measuring operation based on a PSSCH DM-RS sequence scheduled by a PSCCH successfully decoded by the UE, a sidelink RSSI (S-RSSI) measuring operation, and/or an S-RSSI measuring operation based on a sub-channel related to a V2X resource pool. In the present specification, a transmitting operation of the UE may include a transmitting operation of a sidelink channel and/or a sidelink signal (e.g., PSCCH, PSSCH, PSFCH, PSBCH, PSSS/SSSS, etc.). The transmitting operation of the UE may include a transmitting operation of a WAN UL channel and/or a WAN UL signal (e.g., PUSCH, PUCCH, SRS, etc.). In the present specification, a synchronization signal may include an SLSS and/or a PSBCH.

In the present specification, an operation in which the UE performs CBR measurement for the BWP may include an operation in which the UE performs CBR measurement on one or more pools configured in the BWP. The CBR for the BWP may include a CBR measured on the one or more pools configured in the BWP. In the present specification, the BWP may include one or more resource pools.

For example, the UE may perform CBR measurement for one resource pool included in one BWP, and the UE may determine a CBR value measured in the one resource pool as the CBR value of the BWP.

For example, the UE may perform CBR measurement for a plurality of resource pools included in one BWP, and the UE may determine the CBR values of the BWP, based on the CBR values measured in the plurality of resource pools. For example, when the UE performs the CBR measurement for the plurality of resource pools, the UE may consider/determine a maximum value among the CBR measurement values as the CBR values of the BWP. For example, when the UE performs the CBR measurement for the plurality of resource pools, the UE may consider/determine a minimum value among the CBR measurement values as the CBR values of the BWP. For example, when the UE performs the CBR measurement for the plurality of resource pools, the UE may consider/determine an average value of the CBR measurement values or a weight average value as the CBR value of the BWP. For example, when the UE performs the CBR measurement for the plurality of resource pools, the UE may consider/determine a sum of the CBR measurement values as the CBR value of the BWP. For example, when the UE performs the CBR measurement for the plurality of resource pools, the UE may consider/determine a CBR value measured in a pre-configured resource pool as the CBR value of the BWP. For example, when the UE performs the CBR measurement for the plurality of resource pools, the UE may consider/determine a CBR value measured in a pre-configured resource pool related to a lowest index as the CBR value of the BWP. For example, when the UE performs the CBR measurement for the plurality of resource pools, the UE may consider/determine a CBR value measured in a resource pool related to a highest index as the CBR value of the BWP. For example, when the UE performs the CBR measurement for the plurality of resource pools, the UE may consider/determine a CBR value measured in a resource pool having a great CR value (e.g., a resource pool in which CR with a margin against CR_LIMIT is greater than or equal to a pre-configured threshold) as the CBR value of the BWP. For example, when the UE performs the CBR measurement for the plurality of resource pools, the UE may consider/determine a CBR value measured in a resource pool having a small CR value (e.g., a resource pool in which CR with a margin against CR_LIMIT is greater than or equal to a pre-configured threshold) as the CBR value of the BWP.

Some or all of the methods proposed in the present specification may be limited to a transmitting operation of the UE, a transmission carrier selecting operation, and/or a transmission BWP selecting operation. Alternatively, for example, some or all of the methods proposed in the present specification may be limited to a receiving operation of the UE, a reception carrier selecting operation, and/or a reception BWP selecting operation. In the present specification, a configuration may include signaling, signaling from the network, a configuration from the network, and/or a pre-configuration from the network.

In this specification, the priority of a channel/signal may be referred to as a priority related to the channel/signal. For example, a priority related to a channel/signal may include at least one of the priority of a message transmitted through the channel, the priority of data transmitted through the channel, the priority of control information transmitted through the channel, the priority of a signal transmitted through the channel, a priority related to the channel, and/or a priority related to the signal.

In this specification, the PPPP of a channel/signal may be referred to as a PPPP related to the channel/signal. For example, a PPPP related to a channel/signal may include at least one of the PPPP of a message transmitted through the channel, the PPPP of data transmitted through the channel, the PPPP of control information transmitted through the channel, the PPPP of a packet transmitted through the channel, the PPPP of a signal transmitted through the channel, a PPPP related to the channel, and/or a PPPP related to the signal.

In this specification, a small PPPP value may be related to a high priority, and a great PPPP value may be related to a low priority. In this specification, a small ProSe Per-Packet Reliability (PPPR) value may be related to high reliability, and a great PPPR value may be related to low reliability.

Figure 18:
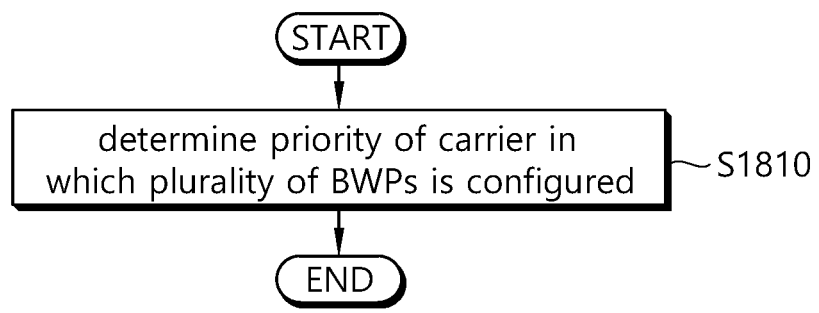
FIG. 18 shows a method for a UE to determine the priority of a carrier including one or more BWPs according to an exemplary embodiment of the present disclosure.

FIG. 18 shows a method for a UE to determine the priority of a carrier including one or more BWPs according to an exemplary embodiment of the present disclosure.

Referring to FIG. 18, in operation S1810, the UE may determine the priority of a carrier in which a plurality of BWPs is configured. For example, the priority may be a reference power control SL priority. In this specification, for convenience of description, the reference power control SL priority may be referred to as PCREF_SLPRI. For example, a PCREF_SLPRI value may be used to determine whether the carrier exceeds PC_PRITHD. Alternatively, for example, the PCREF_SLPRI value may be used to determine the power distribution priority of SL channels/signals on a plurality of carriers. Alternatively, for example, the PCREF_SLPRI value may be used to determine the power distribution priority of an SL channel/signal on a carrier basis. For example, the plurality of BWPs may be active BWPs.

According to an exemplary embodiment of the present disclosure, when SL channels/signals transmitted on the plurality of BWPs in the carrier partially or entirely overlap in the time domain, the UE may derive/determine PCREF_SLPRI based on some or all of the rules proposed below:

The smallest PPPP value may be considered/determined as the PCREF_SLPRI value; and/or The greatest PPPP value may be considered/determined as the PCREF_SLPRI value; and/or A PPPP value related to an SL channel/signal randomly selected (transmitted on a randomly selected BWP) may be considered/determined as the PCREF_SLPRI value; and/or A PPPP value related to an SL channel/signal requiring the highest transmission power may be considered/determined as the PCREF_SLPRI value; and/or A PPPP value related to an SL channel/signal requiring the lowest transmission power may be considered/determined as the PCREF_SLPRI value; and/or A PPPP value related to an SL channel/signal requiring the greatest PPPR value may be considered/determined as the PCREF_SLPRI value; and/or A PPPP value related to an SL channel/signal requiring the smallest PPPR value may be considered/determined as the PCREF_SLPRI value; and/or The smallest PPPP value among PPPP values related to SL channels/signals requiring a transmission power higher than a preset threshold may be considered/determined as the PCREF_SLPRI value; and/or The greatest PPPP value among PPPP values related to SL channels/signals requiring a transmission power lower than the preset threshold may be considered/determined as the PCREF_SLPRI value; and/or The greatest PPPP value among the PPPP values related to the SL channels/signals requiring the transmission power higher than the preset threshold may be considered/determined as the PCREF_SLPRI value; and/or The smallest PPPP value among the PPPP values related to the SL channels/signals requiring the transmission power lower than the preset threshold may be considered/determined as the PCREF_SLPRI value; and/or The smallest PPPP value among PPPP values related to SL channels/signals requiring a PPPR value greater than a preset threshold may be considered/determined as the PCREF_SLPRI value; and/or The greatest PPPP value among PPPP values related to SL channels/signals requiring a PPPR value less than the preset threshold may be considered/determined as the PCREF_SLPRI value; and/or The greatest PPPP value among the PPPP values related to the SL channels/signals requiring the PPPR value greater than the preset threshold may be considered/determined as the PCREF_SLPRI value; and/or The smallest PPPP value among the PPPP values related to the SL channels/signals requiring the PPPR value less than the preset threshold may be considered/determined as the PCREF_SLPRI value; and/or A PPPP value related to an SL channel/signal transmitted on a preset BWP may be considered/determined as the PCREF_SLPRI value; and/or The smallest PPPP value among PPPP values related to SL channels/signals transmitted on BWPs having a CBR that is a preset threshold or less may be considered/determined as the PCREF_SLPRI value; and/or The greatest PPPP value among PPPP values related to SL channels/signals transmitted on BWPs having a CBR that is the preset threshold or greater may be considered/determined as the PCREF_SLPRI value; and/or The greatest PPPP value among the PPPP values related to the SL channels/signals transmitted on the BWPs having the CBR that is the preset threshold or less may be considered/determined as the PCREF_SLPRI value; and/or The smallest PPPP value among the PPPP values related to the SL channels/signals transmitted on the BWPs having the CBR that is the preset threshold or greater may be considered/determined as the PCREF_SLPRI value; and/or The smallest PPPP value among PPPP values related to SL channels/signals transmitted on BWPs having a CR that is a preset threshold or less (e.g., BWPs having a remaining CR of the preset threshold or less relative to a maximum limit on occupancy ratio (CR_LIMIT)) may be considered/determined as the PCREF_SLPRI value; and/or The greatest PPPP value among PPPP values related to SL channels/signals transmitted on BWPs having a CR that is the preset threshold or greater (e.g., BWPs having a remaining CR of the preset threshold or greater relative to CR_LIMIT) may be considered/determined as the PCREF_SLPRI value; and/or The greatest PPPP value among the PPPP values related to the SL channels/signals transmitted on the BWPs having the CR that is the preset threshold or less (e.g., the BWPs having the remaining CR of the preset threshold or less relative to CR_LIMIT) may be considered/determined as the PCREF_SLPRI value; and/or The smallest PPPP value among the PPPP values related to the SL channels/signals transmitted on the BWPs having the CR that is the preset threshold or greater (e.g., the BWPs having the remaining CR of the preset threshold or greater relative to CR_LIMIT) may be considered/determined as the PCREF_SLPRI value; and/or A PPPP value related to an SL channel/signal transmitted on a BWP having a relatively low CBR may be considered/determined as the PCREF_SLPRI value; and/or A PPPP value related to an SL channel/signal transmitted on a BWP having a relatively high CBR may be considered/determined as the PCREF_SLPRI value; and/or A PPPP value related to an SL channel/signal transmitted on a BWP having a relatively low CR (e.g., a BWP having a relatively low remaining CR relative to CR_LIMIT) may be considered/determined as the PCREF_SLPRI value; and/or A PPPP value related to an SL channel/signal transmitted on a BWP having a relatively high CR (e.g., a BWP having a relatively high remaining CR relative to CR_LIMIT) may be considered/determined as the PCREF_SLPRI value; and/or A PPPP value related to an SL channel/signal transmitted on a BWP having a relatively low index may be considered/determined as the PCREF_SLPRI value; and/or A PPPP value related to an SL channel/signal transmitted on a BWP having a relatively high index may be considered/determined as the PCREF_SLPRI value; and/or The smallest PPPP value among PPPP values related to SL channels/signals transmitted on synchronization reference BWPs (e.g., BWPs for time and/or frequency synchronization reference) may be considered/determined as the PCREF_SLPRI value; and/or The greatest PPPP value among the PPPP values related to the SL channels/signals transmitted on the synchronization reference BWPs may be considered/determined as the PCREF_SLPRI value; and/or The smallest PPPP value among PPPP values related to SL channels/signals transmitted on BWPs having a preset numerology (e.g., subcarrier spacing or the like) may be considered/determined as the PCREF_SLPRI value; and/or The greatest PPPP value among the PPPP values related to the SL channels/signals transmitted on the BWPs having the preset numerology (e.g., subcarrier spacing or the like) may be considered/determined as the PCREF_SLPRI value; and/or The smallest PPPP value among PPPP values related to SL channels/signals transmitted on BWPs in which an SLSS resource is configured may be considered/determined as the PCREF_SLPRI value; and/or The greatest PPPP value among the PPPP values related to the SL channels/signals transmitted on the BWPs in which the SLSS resource is configured may be considered/determined as the PCREF_SLPRI value; and/or The smallest PPPP value among PPPP values related to SL channels/signals transmitted on BWPs indicated for (actual) SLSS transmission may be considered/determined as the PCREF_SLPRI value; and/or The greatest PPPP value among the PPPP values related to the SL channels/signals transmitted on the BWPs indicated for (actual) SLSS transmission may be considered/determined as the PCREF_SLPRI value; and/or The smallest PPPP value among PPPP values related to SL channels/signals transmitted on BWPs in which another preset RAT (e.g., dedicated short-range communication (DSRC)) is not detected may be considered/determined as the PCREF_SLPRI value; and/or The greatest PPPP value among the PPPP values related to the SL channels/signals transmitted on the BWPs in which the other preset RAT (e.g., DSRC) is not detected may be considered/determined as the PCREF_SLPRI value; and/or The smallest PPPP value among PPPP values related to SL channels/signals that can be transmitted within the carrier may be considered/determined as the PCREF_SLPRI value; and/or The greatest PPPP value among the PPPP values related to the SL channels/signals that can be transmitted within the carrier may be considered/determined as the PCREF_SLPRI value.

According to an exemplary embodiment of the present disclosure, the UE may determine or obtain the PCREF_SLPRI value of the carrier including the plurality of BWPs according to various methods.

Figure 19:
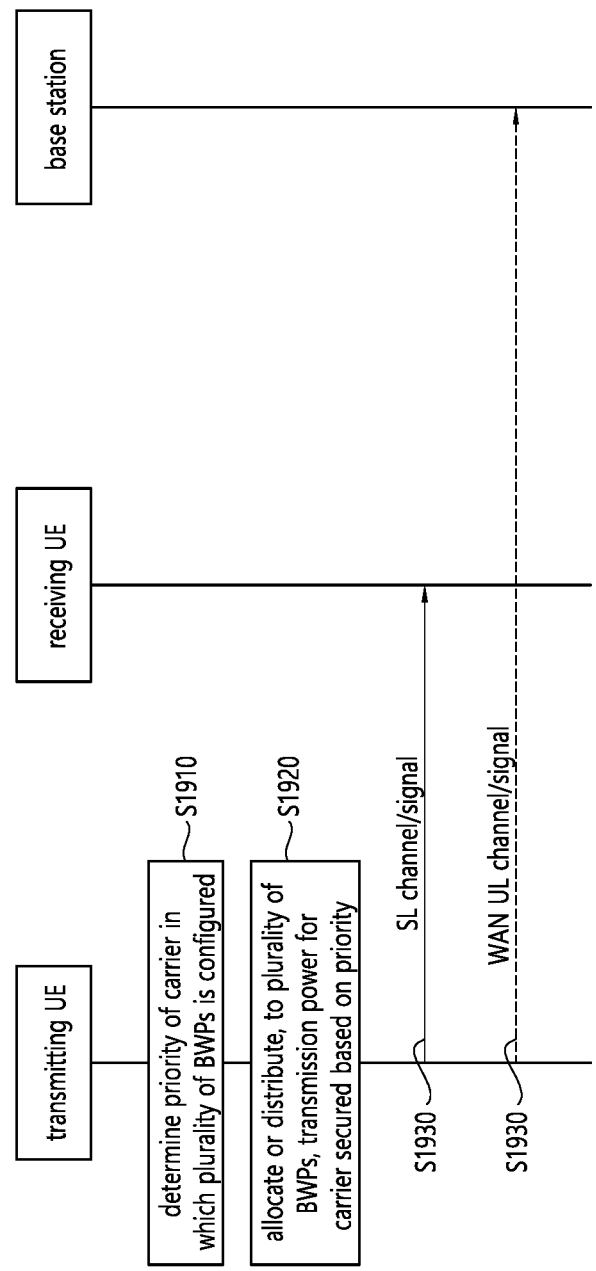
FIG. 19 shows a method for a UE to perform power control for a carrier including one or more BWPs according to an exemplary embodiment of the present disclosure.

FIG. 19 shows a method for a UE to perform power control for a carrier including one or more BWPs according to an exemplary embodiment of the present disclosure.

Referring to FIG. 19, in operation S1910, the UE may determine PCREF_SLPRI of a carrier in which a plurality of BWPs is configured. For example, the UE may determine PCREF_SLPRI of the carrier including the plurality of BWPs according to various methods proposed in operation S1810 of FIG. 18. Specifically, the UE may determine PCREF_SLPRI of a first carrier including a plurality of BWPs, and the UE may determine PCREF_SLPRI of a second carrier including a plurality of BWPs.

In operation S1920, the UE may allocate or secure transmission power for the carrier based on PCREF_SLPRI. For example, the UE may allocate or secure transmission power for the first carrier and transmission power for the second carrier based on PCREF_SLPRI of the first carrier and PCREF_SLPRI of the second carrier. In this specification, for convenience of description, transmission power secured or allocated for each carrier may be referred to as GR_CCPWR. The UE may allocate or distribute GR_CCPWR to the plurality of BWPs. For example, when SL channels/signals transmitted on the plurality of BWPs partially or entirely overlap in the time domain and GR_CCPWR is less than total power required for transmissions of the SL channels/signals transmitted on the plurality of BWPs, the UE may allocate or distribute GR_CCPWR for the plurality of BWPs.

Specifically, when the SL channels/signals transmitted on the plurality of BWPs partially or entirely overlap in the time domain and GR_CCPWR is less than the total power required for the transmissions of the SL channels/signals transmitted on the plurality of BWPs, GR_CCPWR may be allocated or distributed to the SL channels/signals transmitted on the plurality of BWPs according to the following rules. Alternatively, when the SL channels/signals transmitted on the plurality of BWPs partially or entirely overlap in the time domain and GR_CCPWR is less than the total power required for the transmissions of the SL channels/signals transmitted on the plurality of BWPs, GR_CCPWR may be allocated or distributed to the SL channels/signals transmitted on the plurality of BWPs in the carrier according to the following rules:

Power is allocated in ascending order of PPPP values from transmission of an SL channel/signal related to the smallest PPPP value; and/or Power is allocated in descending order of PPPP values from transmission of an SL channel/signal related to the greatest PPPP value; and/or Power is allocated in ascending order of PPPR values from transmission of an SL channel/signal related to the smallest PPPR value; and/or Power is allocated in descending order of PPPR values from transmission of an SL channel/signal related to the greatest PPPR value; and/or Power is allocated from transmission of a randomly selected SL channel/signal; and/or GR_CCPWR is equally distributed to the SL channels/signals; and/or GR_CCPWR is distributed in proportion to power required for transmission of an SL channel/signal; and/or Power is allocated for transmissions of SL channels/signals related to the same PPPP value from randomly selected transmission; and/or Power is allocated for transmissions of SL channels/signals related to the same PPPR value from randomly selected transmission; and/or Power (remaining) is equally distributed to transmissions of SL channels/signals related to the same PPPP value; and/or Power (remaining) is equally distributed to transmissions of SL channels/signals related to the same PPPR value; and/or Power is distributed to transmissions of SL channels/signals related to the same PPPP value in proportion to power required for transmission of an SL channel/signal; and/or Power is distributed to transmissions of SL channels/signals related to the same PPPR value in proportion to power required for transmission of an SL channel/signal; and/or Power is preferentially allocated for transmissions of preset SL channels/signals (e.g., an SLSS/PSBCH). For example, the power is equally distributed to the set SL channels/signals; and/or Power is preferentially allocated for transmissions of preset WAN UL channels/signals. For example, the power is equally distributed to the set WAN UL channels/signals; and/or Power is allocated in descending order of CBRs from an SL channel/signal transmitted on a BWP having a relatively high CBR; and/or Power is allocated in ascending order of CBRs from an SL channel/signal transmitted on a BWP having a relatively low CBR; and/or Power is allocated for transmissions of SL channels/signals transmitted on BWPs having the same CBR from randomly selected transmission; and/or Power (remaining) is equally distributed to transmissions of SL channels/signals transmitted on BWPs having the same CBR; and/or Power is distributed to transmissions of SL channels/signals transmitted on BWPs having the same CBR in proportion of power required for transmission of an SL channel/signal; and/or Power is allocated in ascending order of CRs (e.g., remaining CRs relative to CR_LIMIT) from an SL channel/ signal transmitted on a BWP having a relatively low CR (e.g., a BWP having a relatively low remaining CR relative to CR_LIMIT); and/or Power is allocated in descending order of CRs (e.g., remaining CRs relative to CR_LIMIT) from an SL channel/signal transmitted on a BWP having a relatively high CR (e.g., a BWP having a relatively high remaining CR relative to CR_LIMIT); and/or Power is allocated for SL channels/signals transmitted on BWPs having the same CR from randomly selected transmission; and/or Power (remaining) is equally distributed to SL channels/signals transmitted on BWPs having the same CR; and/or Power is distributed to SL channels/signals transmitted on BWPs having the same CR in proportion to power required for transmission of an SL channel/signal; and/or Power is allocated in ascending order of indices from an SL channel/signal transmitted on a BWP having a relatively low index; and/or Power is allocated in descending order of indices from an SL channel/signal transmitted on a BWP having a relatively high index; and/or Power is allocated from an SL channel/signal transmitted on a randomly selected BWP; and/or GR_CCPWR may be distributed per BWP according to a preset power distribution ratio between the BWPs. Subsequently, the SL channels/signals may be transmitted using power allocated for each BWP. For example, the power distribution ratio between the BWPs may be differently designated according to the type or priority of a service mapped to each BWP.

In operation S1930, the UE may transmit the SL channels/signals on the plurality of BWPs using transmission power allocated or distributed to the plurality of BWPs. Additionally, the UE may transmit a WAN UL channel/signal on the plurality of BWPs using the transmission power allocated or distributed to the plurality of BWPs.

According to an exemplary embodiment of the present disclosure, when the SL channels/signals (and/or WAN UL channels/signals) transmitted on the plurality of BWPs partially or entirely overlap in the time domain and the transmission power for the carrier secured by the UE is less than the total power required for the transmissions of the SL channels/signals (and/or WAN UL channels/signals) transmitted on the plurality of BWPs, the UE may efficiently transmit the SL channels/signals (and/or WAN UL channels/signals).

According to an exemplary embodiment of the present disclosure, PC_PRITHD used to determine the power distribution priorities of SL channel/signal transmission and WAN UL channel/signal transmission on different carriers may be set differently or separately from PC_PRITHD used to determine the power distribution priorities of SL channel/signal transmission and WAN UL channel/signal transmission in the same carrier. Here, for example, the SL channel/signal transmission and the WAN UL channel/signal transmission may partially or entirely overlap in the time domain. In this specification, for convenience of description, PC_PRITHD used to determine the power distribution priorities of the SL channel/signal transmission and the WAN UL channel/signal transmission on the different carriers may be referred to as first PC_PRITHD, and PC_PRITHD used to determine the power distribution priorities of the SL channel/signal transmission and the WAN UL channel/signal transmission in the same carrier may be referred to as second PC_PRITHD.

For example, a first PC_PRITHD value may be separately or differently set for each combination of the type or priority of a WAN (UL) communication (e.g., URLLC or EMBB)-related service and the type or priority (e.g., the PPPP value or PPPR value) of an SL communication-related service. For example, when URLLC-related service transmission and SL-related service transmission partially or entirely overlap in the time domain, the first PC_PRITHD value may be set to a relatively small value (e.g., setting a small PC_PRITHD value means that a high priority related to an SL service/packet is designated as a threshold reference value), and the UE may preferentially distribute power to the URLLC-related service transmission compared to the SL-related service transmission (e.g., SL service/packet transmission having a priority higher than the first PC_PRITHD value) (with high probability or on average). For example, the first PC_PRITHD value may be (differently or separately) set based on the relative priorities of WAN (UL) communication and SL communication.

For example, a second PC_PRITHD value may be separately or differently set for each combination of the type or priority of a WAN (UL) communication (e.g., URLLC or EMBB)-related service and the type or priority (e.g., the PPPP value or PPPR value) of an SL communication-related service. For example, when URLLC-related service transmission and SL-related service transmission partially or entirely overlap in the time domain, the second PC_PRITHD value may be set to a relatively small value, and the UE may preferentially perform the URLLC-related service transmission compared to the SL-related service transmission (e.g., SL service/packet transmission having a priority higher than the second PC_PRITHD value) (with high probability or on average). Here, for example, the UE may omit the SL-related service transmission (if not capable of simultaneous transmission of a plurality of channels/signals at the same time within one carrier). For example, the second PC_PRITHD value may be (differently or separately) set based on the relative priorities of WAN (UL) communication and SL communication.

Figure 20:
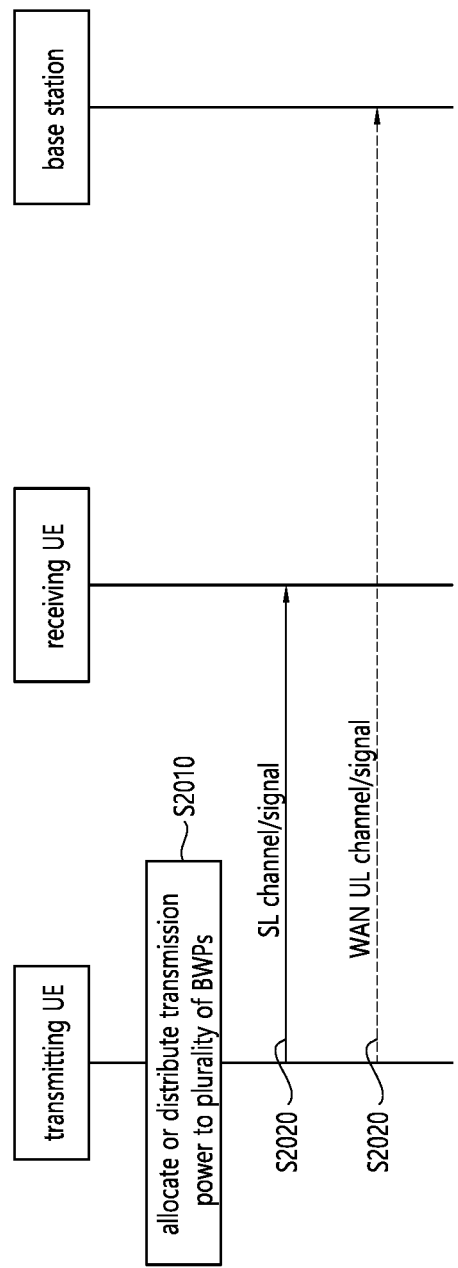
FIG. 20 shows a method for a UE to perform power control for a plurality of BWPs according to an exemplary embodiment of the present disclosure.

FIG. 20 shows a method for a UE to perform power control for a plurality of BWPs according to an exemplary embodiment of the present disclosure.

Referring to FIG. 20, in operation S2010, the UE may distribute power to SL channels/signals transmitted on a plurality of BWPs, which partially or entirely overlap in the time domain, on a BWP basis regardless of carriers. Alternatively, the UE may distribute power to SL channels/signals (and/or WAN UL channels/signals) transmitted on the plurality of BWPs, which partially or entirely overlap in the time domain, on a BWP basis regardless of carriers.

According to an exemplary embodiment of the present disclosure, when total power required for transmissions of the SL channels/signals (and/or WAN UL channels/signals) transmitted on the plurality of BWPs, which partially or entirely overlap in the time domain, exceeds P_CMAX, the UE may allocate transmission power for the SL channels/signals (and/or WAN UL channels/signals) according to whether a PPPP value related to the SL channels/signals exceeds PC_PRITHD. Specifically, the UE may allocate transmission power for the SL channels/signals (and/or WAN UL channels/signals) by the following methods.

1) Case where total power required for transmissions of an SL channel/signal and/or a WAN UL channel/signal transmitted on a plurality of BWPs, which partially or entirely overlap in the time domain, exceeds P_CMAX 1.1) When a PPPP value related to the SL channel/signal is less than PC_PRITHD, the UE may reduce transmission power for the WAN UL channel/signal until the total power required for the transmissions of the SL channel/signal and the WAN UL channel/signal does not exceed P_CMAX. Alternatively, the UE may omit transmission of the WAN UL channel/signal.

1.2) When the PPPP value related to the SL channel/signal is greater than PC_PRITHD, the UE may reduce transmission power for the SL channel/signal until the total power required for the transmissions of the SL channel/signal and the WAN UL channel/signal does not exceed P_CMAX. Alternatively, the UE may omit transmission of the SL channel/signal.

2) When total power required for transmissions of SL channels/signals transmitted on a plurality of BWPs, which partially or entirely overlap in the time domain, exceeds P_CMAX, the UE may reduce transmission power for the SL channels/signals in descending order of PPPP values from transmission power for an SL channel/signal related to the greatest PPPP value until the total power required for the transmissions of the SL channels/signals does not exceed P_CMAX. For example, even though the UE omits transmission of the SL channel/signal related to the greatest PPPP value, when total power required for transmissions of the remaining SL channels/signals exceeds P_CMAX, the UE may reduce transmission power for an SL channel/signal related to the second greatest PPPP value.

According to an exemplary embodiment of the present disclosure, when total power required for transmissions of SL channels/signals (and/or WAN UL channels/signals) transmitted on a plurality of BWPs, which partially or entirely overlap in the time domain, exceeds P_CMAX, P_CMAX may be allocated or distributed to the transmissions of the SL channels/signals (and/or WAN UL channels/signals) transmitted on the plurality of BWPs according to the following rules:

Power is allocated in ascending order of PPPP values from transmission of an SL channel/signal related to the smallest PPPP value; and/or Power is allocated in descending order of PPPP values from transmission of an SL channel/signal related to the greatest PPPP value; and/or Power is allocated in ascending order of PPPR values from transmission of an SL channel/signal related to the smallest PPPR value; and/or Power is allocated in descending order of PPPR values from transmission of an SL channel/signal related to the greatest PPPR value; and/or Power is allocated from transmission of a randomly selected SL channel/signal; and/or Power is equally distributed to the SL channels/signals; and Power is distributed in proportion to power required for transmission of an SL channel/signal; and/or Power is allocated for transmissions of SL channels/signals related to the same PPPP value from randomly selected transmission; and/or Power is allocated for transmissions of SL channels/signals related to the same PPPR value from randomly selected transmission; and/or Power (remaining) is equally distributed to transmissions of SL channels/signals related to the same PPPP value; and/or Power (remaining) is equally distributed to transmissions of SL channels/signals related to the same PPPR value; and/or Power is distributed to transmissions of SL channels/signals related to the same PPPP value in proportion to power required for transmission of an SL channel/signal; and/or Power is distributed to transmissions of SL channels/signals related to the same PPPR value in proportion to power required for transmission of an SL channel/signal; and/or Power is preferentially allocated for transmissions of preset SL channels/signals (e.g., an SLSS/PSBCH). For example, the power is equally distributed to the set SL channels/signals; and/or Power is preferentially allocated for transmissions of preset WAN UL channels/signals. For example, the power is equally distributed to the set WAN UL channels/signals; and/or Power is allocated in descending order of CBRs from an SL channel/signal transmitted on a BWP having a relatively high CBR; and/or Power is allocated in ascending order of CBRs from an SL channel/signal transmitted on a BWP having a relatively low CBR; and/or Power is allocated for transmissions of SL channels/signals transmitted on BWPs having the same CBR from randomly selected transmission; and/or Power (remaining) is equally distributed to transmissions of SL channels/signals transmitted on BWPs having the same CBR; and/or Power is distributed to transmissions of SL channels/signals transmitted on BWPs having the same CBR in proportion of power required for transmission of an SL channel/signal; and/or Power is allocated in ascending order of CRs (e.g., remaining CRs relative to CR_LIMIT) from an SL channel/signal transmitted on a BWP having a relatively low CR (e.g., a BWP having a relatively low remaining CR relative to CR_LIMIT); and/or Power is allocated in descending order of CRs (e.g., remaining CRs relative to CR_LIMIT) from an SL channel/signal transmitted on a BWP having a relatively high CR (e.g., a BWP having a relatively high remaining CR relative to CR_LIMIT); and/or Power is allocated for SL channels/signals transmitted on BWPs having the same CR from randomly selected transmission; and/or Power (remaining) is equally distributed to SL channels/signals transmitted on BWPs having the same CR; and/or Power is distributed to SL channels/signals transmitted on BWPs having the same CR in proportion to power required for transmission of an SL channel/signal; and/or Power is allocated in ascending order of indices from an SL channel/signal transmitted on a BWP having a relatively lower index; and/or Power is allocated in descending order of indices from an SL channel/signal transmitted on a BWP having a relatively high index; and/or Power is allocated from an SL channel/signal transmitted on a randomly selected BWP; and/or Power may be distributed per BWP according to a preset power distribution ratio between the BWPs. Subsequently, the SL channels/signals may be transmitted using power allocated for each BWP. For example, the power distribution ratio between the BWPs may be differently designated according to the type or priority of a service mapped to each BWP.

According to an exemplary embodiment of the present disclosure, a minimum secured power value may be set separately or differently for each BWP for the UE. Alternatively, for example, a maximum allowable power value or a maximum allocable power value may be separately or differently set for each BWP for the UE. In this case, when the total power required for the transmission of the SL channels/signals (and/or WAN UL channels/signals) transmitted on the plurality of BWPs, which partially or entirely overlap in the time domain, exceeds P_CMAX, it is possible to prevent transmission power for an SL channel/signal related to a relatively great PPPP value from being too reduced or to prevent transmission of the SL channel/signal related to the relatively great PPPP value from being omitted. Alternatively, in this case, when the total power required for the transmission of the SL channels/signals (and/or WAN UL channels/signals) transmitted on the plurality of BWPs, which partially or entirely overlap in the time domain, exceeds P_CMAX, it is possible to prevent transmission power for an SL channel/signal related to a relatively great PPPR value from being too reduced or to prevent transmission of the SL channel/signal related to the relatively great PPPR value from being omitted. Here, for example, the minimum secured power value, the maximum allowable power value, or the maximum allocable power value may be separately or differently set according to the type of a service, the priority of the service priority, a PPPP value related to the service, and/or a PPPR value related to the service.

According to an exemplary embodiment of the present disclosure, an open-loop power control parameter (e.g., P_O, ALPHA, or the like) may be separately or differently set for each BWP. Alternatively, a closed-loop power control operation may be separately or differently managed for each BWP. Here, for example, the open-loop power control parameter or the closed-loop power control operation may be separately or differently set according to the type of a service, the priority of the service priority, a PPPP value related to the service, and/or a PPPR value related to the service.

In operation S2020, the UE may transmit the SL channels/signals on the plurality of BWPs using the transmission power allocated or distributed to the plurality of BWPs. Additionally, the UE may transmit a WAN UL channel/signal on the plurality of BWPs using the transmission power allocated or distributed to the plurality of BWPs.

According to an exemplary embodiment of the present disclosure, when the SL channels/signals (and/or WAN UL channels/signals) transmitted on the plurality of BWPs partially or entirely overlap in the time domain and the maximum transmission power of the UE is less than total power required for transmissions of the SL channels/signals (and/or WAN UL channels/signals) transmitted on the plurality of BWPs, the UE may efficiently transmit the SL channels/signals (and/or WAN UL channels/signals).

Figure 21:
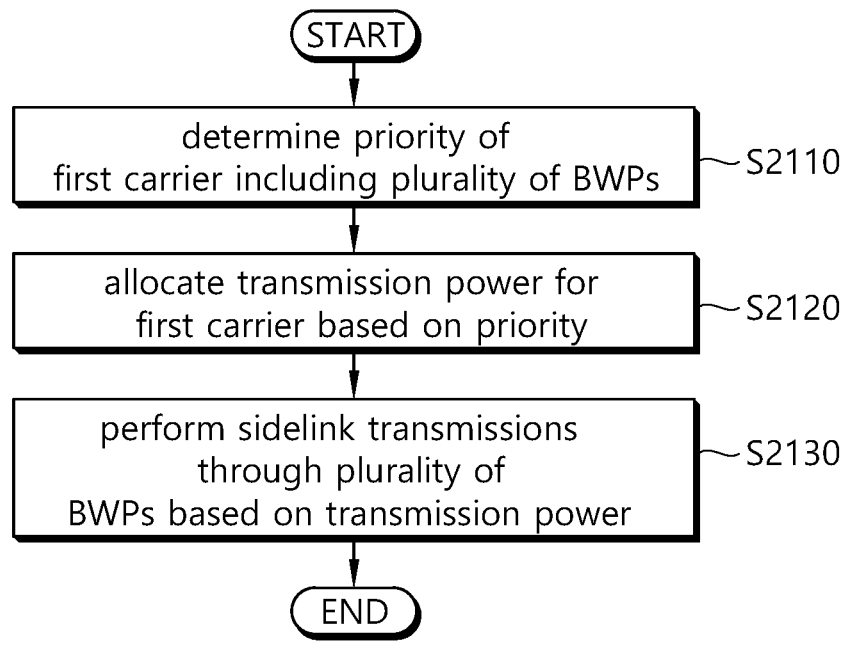
FIG. 21 shows a method for a first device 100 to perform sidelink transmission according to an exemplary embodiment of the present disclosure.

FIG. 21 shows a method for a first device 100 to perform sidelink transmission according to an exemplary embodiment of the present disclosure.

Referring to FIG. 21, in operation S110, the first device 100 may determine the priority of a first carrier including a plurality of BWPs. For example, the first device 100 may determine the priority of the first carrier including the plurality of BWPs according to various methods proposed in this specification.

The first device 100 may include, for example, at least one of a transmission UE, a reception UE, a wireless device, a wireless communication device, a vehicle, a vehicle having an autonomous driving function, a connected car, an unmanned aerial vehicle (UAV), an artificial intelligence (AI) module, a robot, an augmented reality (AR) device, a virtual reality (VR) device, a mixed reality (MR) device, a laptop computer, a digital broadcasting terminal a tablet PC, a smartphone, a wearable device, a hologram device, a public safety device, an MTC device, an IoT device, a medical device, a fintech device, a security device, or an environmental device.

For example, the highest priority among the priorities of sidelink transmissions through the plurality of BWPs may be determined as the priority of the first carrier. For example, the priority of sidelink transmission requiring the highest transmission power among the sidelink transmissions through the plurality of BWPs may be determined as the priority of the first carrier. For example, the priority of sidelink transmission through a preset BWP among the priorities of the sidelink transmissions through the plurality of BWPs may be determined as the priority of the first carrier. For example, the highest priority among the priorities of sidelink transmissions through one or more BWPs used for the first device 100 to obtain time or frequency synchronization may be determined as the priority of the first carrier.

Additionally, the first device 100 may measure the channel busy ratio (CBR) of the plurality of BWPs. In this case, the highest priority selected based on the CBR from among the priorities of the sidelink transmissions through the plurality of BWPs may be determined as the priority of the first carrier.

In operation S2120, the first device 100 may allocate transmission power for the first carrier based on the priority. For example, the transmission power allocated for the first carrier may be less than transmission power required for the sidelink transmissions through the plurality of BWPs.

In operation S2130, the first device 100 may perform the sidelink transmissions through the plurality of BWPs based on the transmission power. For example, the sidelink transmissions through the plurality of BWPs may overlap in the time domain. For example, the first device 100 may allocate or distribute the transmission power to the plurality of BWPs according to various methods proposed in this specification.

For example, the transmission power allocated for the first carrier may be preferentially allocated for sidelink transmission having a high priority among the sidelink transmissions through the plurality of BWPs. For example, the transmission power allocated for the first carrier may be equally allocated for the sidelink transmissions through the plurality of BWPs. For example, the transmission power allocated for the first carrier may be preferentially allocated for preset sidelink transmission.

Additionally, the first device 100 may measure the channel busy ratio (CBR) of the plurality of BWPs. In this case, for example, the transmission power allocated for the first carrier may be preferentially allocated for sidelink transmission through a BWP having a high CBR among the sidelink transmission through the plurality of BWPs.

Additionally, the first device 100 may determine the priority of a second carrier including a plurality of BWPs. In this case, for example, the transmission power for the first carrier may be allocated based on the priority of the first carrier and the priority of the second carrier.

The proposed method may be performed by various devices described herein. First, a processor 102 of the first device 100 may determine the priority of the first carrier including the plurality of BWPs. In addition, the processor 102 of the first device 100 may allocate the transmission power for the first carrier based on the priority. Further, the processor 102 of the first device 100 may control a transceiver 106 to perform the sidelink transmissions through the plurality of BWPs based on the transmission power.

Since the foregoing examples of the proposed method may also be included as implementation methods of the present disclosure, it will be apparent that the examples of the proposed method can be viewed as proposed methods. These proposed methods may be independently implemented, and some thereof may be implemented in a combined (or merged) form. For example, although the proposed method has been described based on a 3GPP system in the present disclosure for simplicity, the scope of systems to which the proposed method can be applied may be extended to other systems apart from the 3GPP LTE system.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
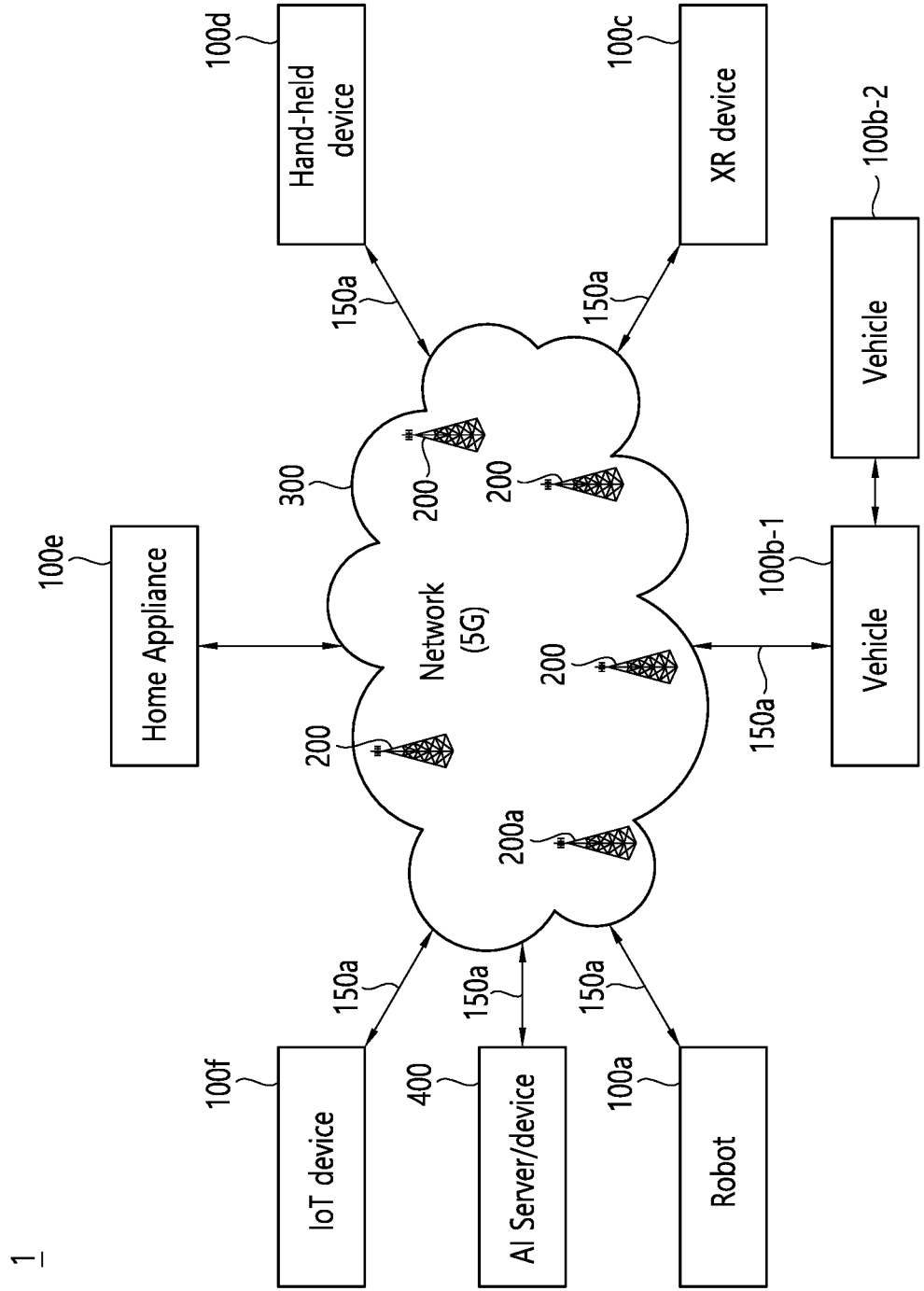
FIG. 22 shows a communication system 1 applied to the present disclosure.

FIG. 22 shows a communication system 1 applied to the present disclosure.

Referring to FIG. 22, a communication system 1 applied to the present disclosure includes wireless devices, base stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended reality (XR) device 100*c*, a hand-held device 100*d*, a home appliance 100*e*, an Internet of things (IoT) device 100*f*, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
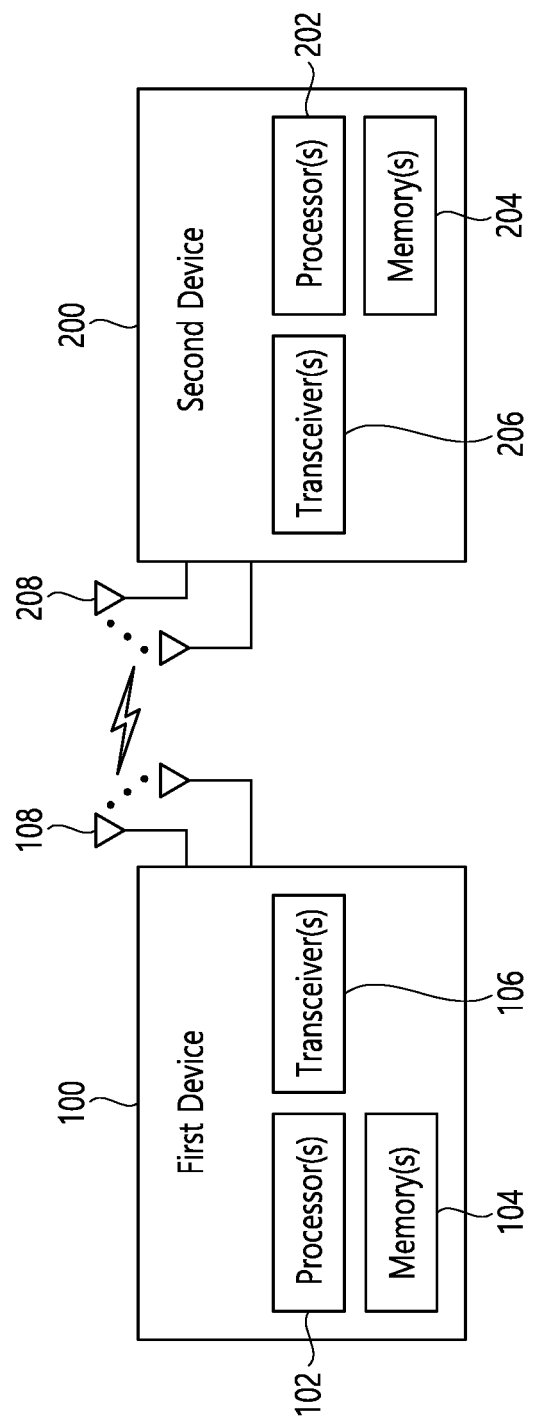
FIG. 23 shows wireless devices applicable to the present disclosure.

FIG. 23 shows wireless devices applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
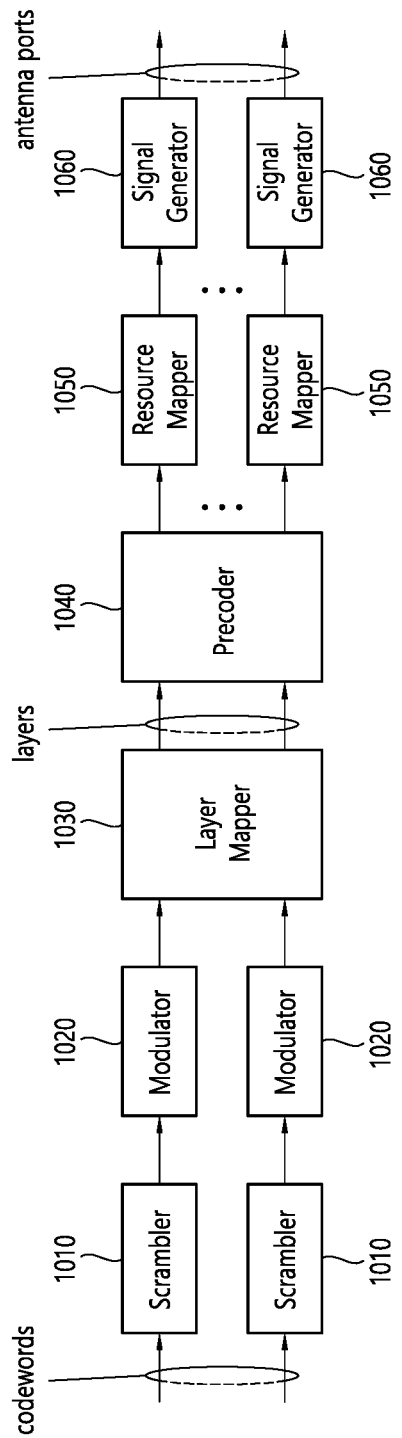
FIG. 24 shows a signal process circuit for a transmission signal.

FIG. 24 shows a signal process circuit for a transmission signal.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
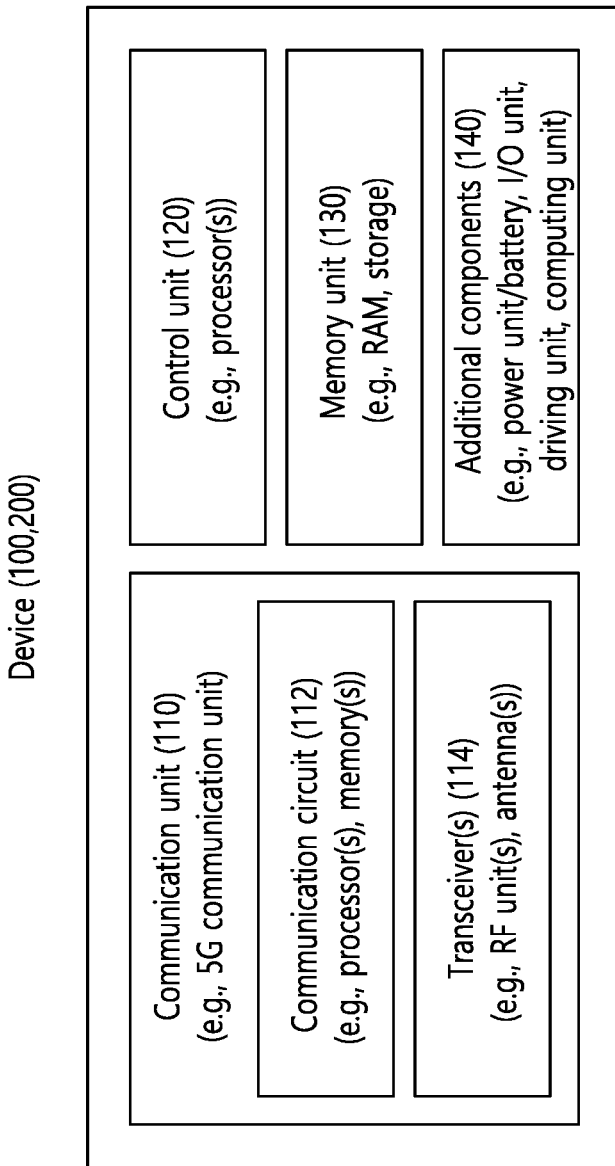
FIG. 25 shows another example of a wireless device applied to the present disclosure.

FIG. 25 shows another example of a wireless device applied to the present disclosure. The wireless device may be implemented in various forms according to a use-case/service (refer to FIG. 22 and FIGS. 26 to 31).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcasting terminal, a hologram device, a public safety device, an MTC device, a medical device, a fintech device (or a finance device), a security device, a climate/environmental device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
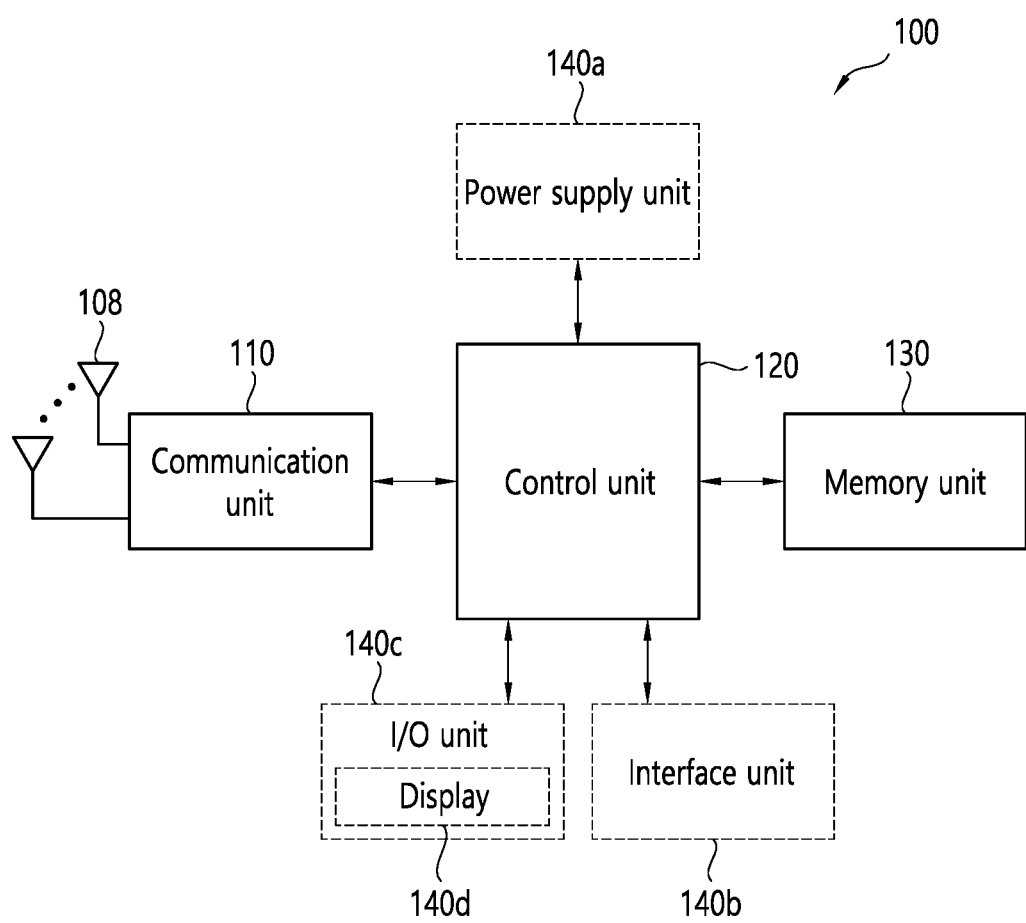
FIG. 26 shows a hand-held device applied to the present disclosure.

FIG. 26 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
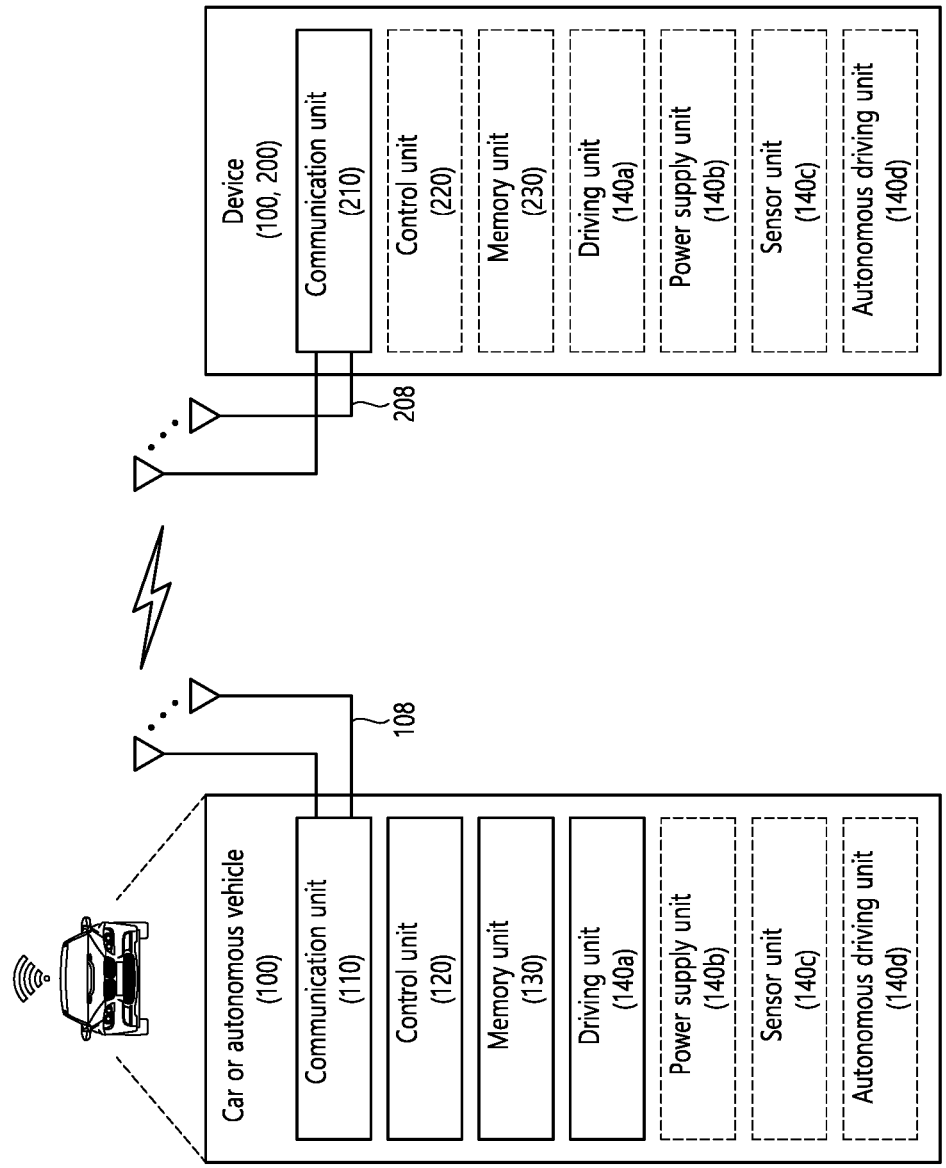
FIG. 27 shows a vehicle or an autonomous driving vehicle applied to the present disclosure.

FIG. 27 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 28:
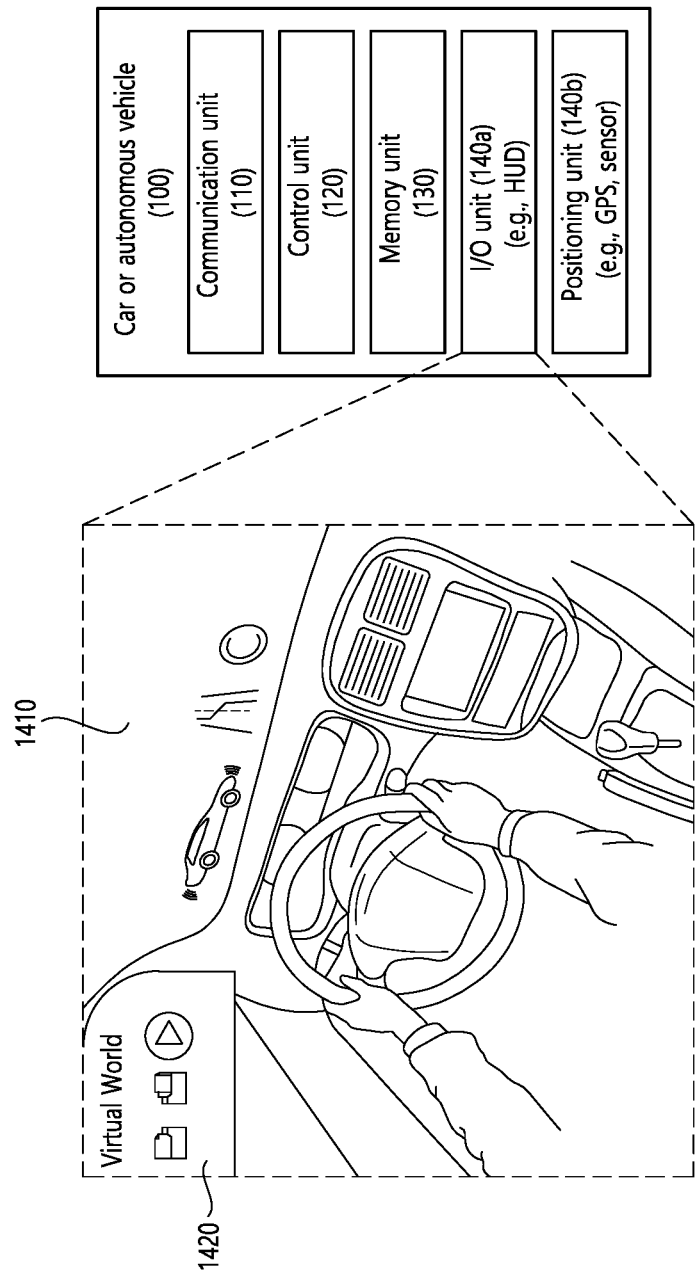
FIG. 28 shows a vehicle applied to the present disclosure.

FIG. 28 shows a vehicle applied to the present disclosure. The vehicle may be implemented as a transport means, an aerial vehicle, a ship, etc.

Referring to FIG. 28, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 25.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Figure 29:
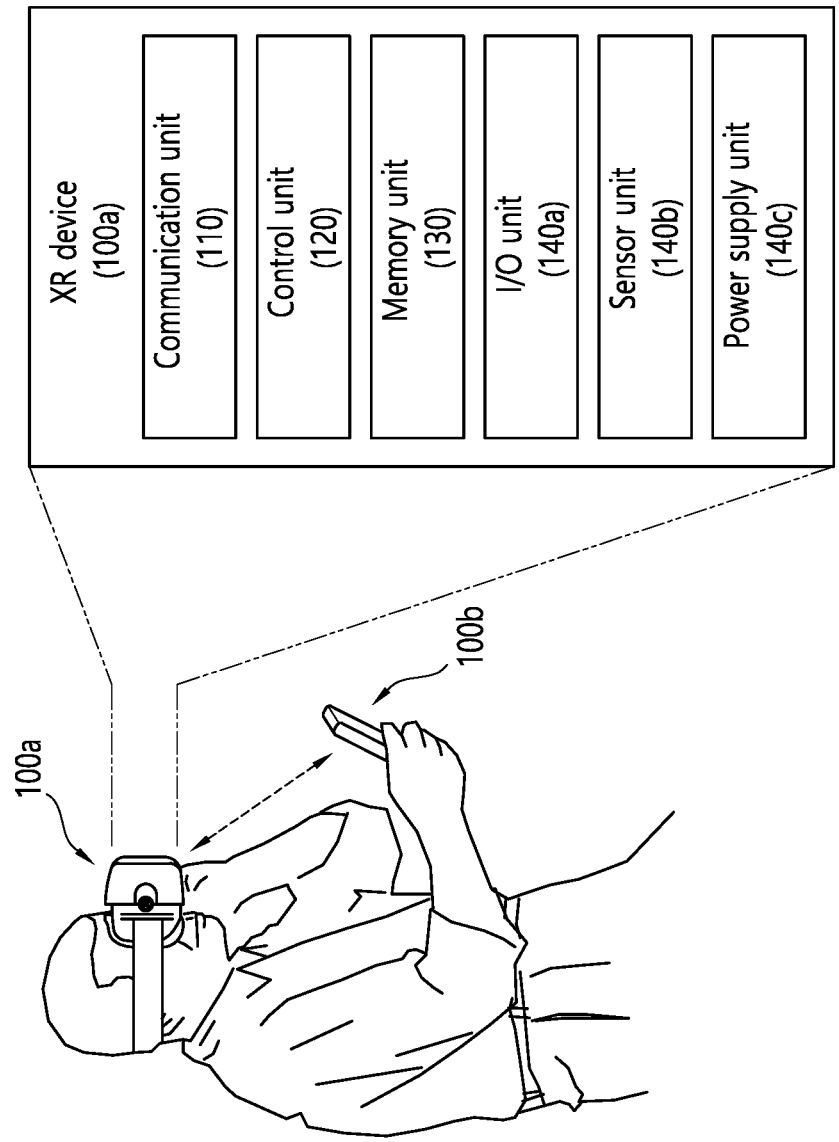
FIG. 29 shows an XR device applied to the present disclosure.

FIG. 29 shows an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 29, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 25, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Figure 30:
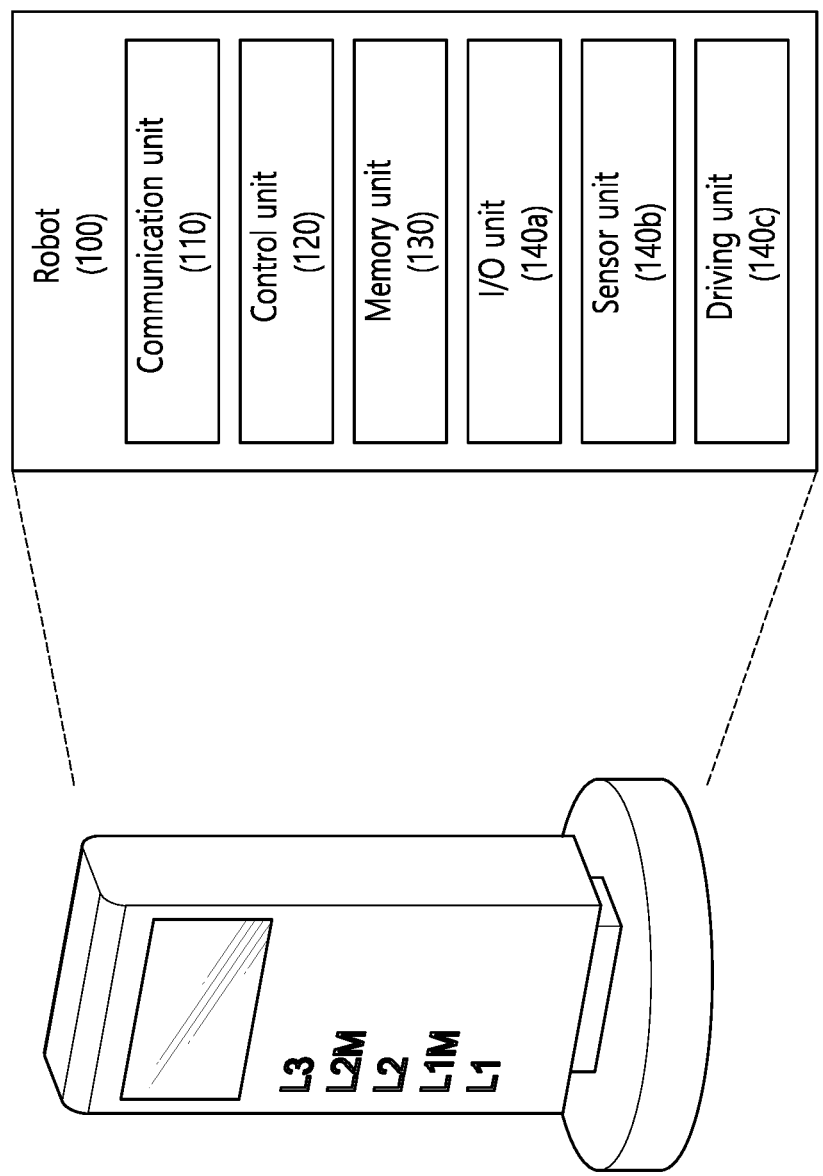
FIG. 30 shows a robot applied to the present disclosure.

FIG. 30 shows a robot applied to the present disclosure. The robot may be categorized into an industrial robot, a medical robot, a household robot, a military robot, etc., according to a used purpose or field.

Referring to FIG. 30, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 25, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Figure 31:
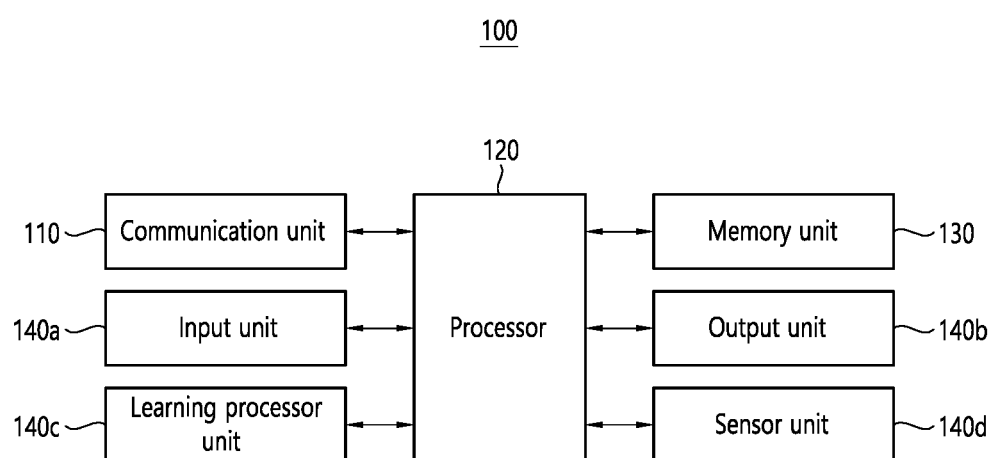
FIG. 31 shows an AI device applied to the present disclosure.

FIG. 31 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 31, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 25, respectively.

The communication unit 110 may transmit and receive wired/radio signals (e.g., sensor information, user input, learning models, or control signals) to and from external devices such as other AI devices (e.g., 100x, 200, or 400 of FIG. 22) or an AI server (e.g., 400 of FIG. 22) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 22). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 22). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

What is claimed is:

1. A method for performing wireless communication by a first device, the method comprising:
    obtaining, by the first device, configuration related to a plurality of bandwidth parts (BWPs),
        wherein the plurality of BWPs include a plurality of sidelink BWPs,
    measuring, by the first device, a channel busy ratio (CBR) for each of the plurality of sidelink BWPs;
    selecting, by the first device, at least one sidelink BWP among the plurality of sidelink BWPs, based on the CBR for the each of the plurality of sidelink BWPs;
    determining, by the first device, a highest priority among at least one priority of the at least one sidelink BWP, as a priority of a first carrier comprising the at least one sidelink BWP,
        wherein based on the at least one sidelink BWP being activated, sidelink transmission on the at least one sidelink BWP is performed;
    allocating, by the first device, transmit power for the first carrier based on the priority of the first carrier; and
    performing, by the first device, the sidelink transmission through the at least one sidelink BWP based on the transmit power.

2. The method of claim 1, wherein the highest priority of sidelink transmission requiring highest transmit power among at least one priority of the sidelink transmission through the at least one sidelink BWP is determined as the priority of the first carrier.

3. The method of claim 1, wherein the highest priority of sidelink transmission through a preset sidelink BWP among at least one priority of the sidelink transmission through the at least one sidelink BWP is determined as the priority of the first carrier.

4. The method of claim 1, wherein the highest priority among at least one priority of sidelink transmission through at least one sidelink BWP used for the first device to obtain time or frequency synchronization is determined as the priority of the first carrier.

5. The method of claim 1, wherein based on a number of the at least one sidelink BWP being two or more, the sidelink transmission through the at least one sidelink BWP overlap in a time domain.

6. The method of claim 1, wherein the transmit power allocated for the first carrier is less than transmit power required for the sidelink transmission through the at least one sidelink BWP.

7. The method of claim 6, wherein the transmit power allocated for the first carrier is preferentially allocated for sidelink transmission having a high priority among the sidelink transmission through the at least one sidelink BWP.

8. The method of claim 6, wherein the transmit power allocated for the first carrier is equally allocated for the sidelink transmission through the at least one sidelink BWP.

9. The method of claim 6, wherein the transmit power allocated for the first carrier is preferentially allocated for preset sidelink transmission.

10. The method of claim 6, further comprising:
wherein the transmit power allocated for the first carrier is preferentially allocated for sidelink transmission through a BWP having a high CBR among the sidelink transmission through the at least one sidelink BWP.

11. The method of claim 1, wherein the first device comprises at least one of a transmission UE, a reception UE, a wireless device, a wireless communication device, a vehicle, a vehicle having an autonomous driving function, a connected car, an unmanned aerial vehicle (UAV), an artificial intelligence (AI) module, a robot, an augmented reality (AR) device, a virtual reality (VR) device, a mixed reality (MR) device, a laptop computer, a digital broadcasting terminal a tablet PC, a smartphone, a wearable device, a hologram device, a public safety device, an MTC device, an IoT device, a medical device, a fintech device, a security device, or an environmental device.

12. A first device for performing wireless communication, the first device comprising:
at least one memory;
at least one transceiver; and
at least one processor to couple the at least one memory and the at least one transceiver, wherein the processor is configured to:
obtain, configuration related to a plurality of bandwidth parts (BWPs),
wherein the plurality of BWPs includes a plurality of sidelink BWPs,
measure, a channel busy ratio (CBR) for each of the plurality of sidelink BWPs;
select, at least one sidelink BWP among the plurality of sidelink BWPs, based on the CBR for the each of the plurality of sidelink BWPs;
determine a highest priority among at least one priority of the at least one sidelink BWP, as a priority of a first carrier comprising the at least one sidelink BWP, wherein based on the at least one sidelink BWP being activated, sidelink transmission on the at least one sidelink BWP is performed;
allocate transmit power for the first carrier based on the priority of the first carrier; and
control the at least one transceiver to perform the sidelink transmission through the at least one sidelink BWP based on the transmit power.

* * * * *